US012648009B2

(12) United States Patent
He et al.

(10) Patent No.: US 12,648,009 B2
(45) Date of Patent: *Jun. 2, 2026

(54) METHODS FOR POWER-EFFICIENT TRANSFER OF SMALL DATA IN RADIO RESOURCE CONTROL CONNECTED LITE MODE

(71) Applicant: QUALCOMM Incorporated, San Diego, CA (US)

(72) Inventors: Linhai He, San Diego, CA (US); Jing Lei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/662,810

(22) Filed: May 13, 2024

(65) Prior Publication Data

US 2024/0298341 A1     Sep. 5, 2024

Related U.S. Application Data

(63) Continuation of application No. 17/077,957, filed on Oct. 22, 2020, now Pat. No. 12,035,339.

(Continued)

(51) Int. Cl.
*H04W 76/00*          (2018.01)
*H04L 5/00*           (2006.01)
(Continued)

(52) U.S. Cl.
CPC ........... *H04W 72/53* (2023.01); *H04L 5/0055* (2013.01); *H04W 8/08* (2013.01); *H04W 8/24* (2013.01);
(Continued)

(58) Field of Classification Search
CPC ..... H04W 72/0493; H04W 8/08; H04W 8/24; H04W 24/08; H04W 72/1257;
(Continued)

(56) References Cited

U.S. PATENT DOCUMENTS

2017/0311278 A1* 10/2017 Adjakple .............. H04W 60/04
2018/0092157 A1*  3/2018 Chen ..................... H04W 76/27
(Continued)

FOREIGN PATENT DOCUMENTS

CN          105325029 A     2/2016
CN          110178335 A     8/2019
(Continued)

OTHER PUBLICATIONS

International Preliminary Report on Patentability—PCT/US2020/057091, The International Bureau of WIPO—Geneva, Switzerland, May 5, 2022.
(Continued)

*Primary Examiner* — Lakeram Jangbahadur
(74) *Attorney, Agent, or Firm* — Holland & Hart LLP

(57)          ABSTRACT

Methods, systems, and devices for wireless communications are described. A user equipment (UE) may transmit, to a base station during a connection establishment procedure, a UE message indicating support for a plurality of connected modes, where the plurality of connected modes includes a first connected mode. The UE may receive, based at least in part on the UE message, a configuration message from the base station configuring resources for the UE to use while operating in the first connected mode. The UE may perform a grantless communication with the base station while operating in the first connected mode and using the configured resources.

26 Claims, 17 Drawing Sheets

Related U.S. Application Data

(60) Provisional application No. 62/925,984, filed on Oct. 25, 2019.

(51) Int. Cl.

| | |
|---|---|
| *H04W 8/08* | (2009.01) |
| *H04W 8/24* | (2009.01) |
| *H04W 24/08* | (2009.01) |
| *H04W 72/50* | (2023.01) |
| *H04W 72/53* | (2023.01) |
| *H04W 76/15* | (2018.01) |
| *H04W 76/27* | (2018.01) |
| *H04W 74/0833* | (2024.01) |

(52) U.S. Cl.
CPC ......... *H04W 24/08* (2013.01); *H04W 72/535* (2023.01); *H04W 76/15* (2018.02); *H04W 76/27* (2018.02); *H04W 74/0833* (2013.01)

(58) Field of Classification Search
CPC . H04W 74/0833; H04W 76/15; H04W 76/27; H04W 72/1284; H04L 5/0055; Y02D 30/70
See application file for complete search history.

(56) References Cited

U.S. PATENT DOCUMENTS

| | | | |
|---|---|---|---|
| 2018/0302826 A1 | 10/2018 | Frederiksen et al. | |
| 2019/0045459 A1* | 2/2019 | Niu ..................... | H04W 52/365 |
| 2019/0159132 A1 | 5/2019 | Abraham et al. | |
| 2019/0174571 A1* | 6/2019 | Deenoo ................. | H04W 76/27 |
| 2019/0289534 A1* | 9/2019 | Ryoo ................... | H04W 48/18 |
| 2019/0289660 A1 | 9/2019 | Yi et al. | |
| 2019/0335494 A1* | 10/2019 | Namba ................. | H04L 5/0055 |
| 2021/0127397 A1 | 4/2021 | He et al. | |

FOREIGN PATENT DOCUMENTS

| | | |
|---|---|---|
| EP | 3439374 A1 | 2/2019 |
| WO | 2018003875 A2 | 1/2018 |

OTHER PUBLICATIONS

International Search Report and Written Opinion—PCT/US2020/057091—ISA/EPO—Feb. 8, 2021.

Ipwireless Inc: "Connectionless Approaches to Supporting Diverse Data Applications", 3GPP Draft; 3GPP TSG RAN WG2 Meeting #77, R2-120444, 3rd Generation Partnership Project (3GPP), Mobile Competence Centre; 650, Route Des Lucioles; F-06921 Sophia-Antipolis Cedex; France, vol. RAN WG2, No. Dresden, Germany; Feb. 6, 2012-Feb. 10, 2012, Jan. 30, 2012 (Jan. 30, 2012), pp. 1-5, XP050565166, [retrieved on Jan. 30, 2012] the whole document.

Qualcomm: "Further Discussions on HS-SCCH DRX Lite Proposal", 3GPP TSG RAN WG1 Meeting #84-bis, 3GPP Draft; R1-162239, Further Discussions on HS-SCCH DRX Lite Proposal, 3rd Generation Partnership Project (3GPP), Mobile Competence Centre; 650, Route Des Lucioles; F-06921 Sophia-Antipolis Cedex; France, vol. RAN WG1, No. Susan, South Korea; Apr. 10, 2016-Apr. 14, 2016, Apr. 2, 2016 (Apr. 2, 2016), 3 Pages, XP051079947, the whole document.

Qualcomm Incorporated, et al., "Efficient Small Data Transmission with S1-Based Architecture," 3GPP TSG-SA WG2#110, S2-152664_WAS2614_WAS2552_WAS2259_CIOT_SMALL_DATA-R2, 3rd Generation Partnership Project, Mobile Competence Centre, 650, Route Des Lucioles, F-06921, Sophia-Antipolis Cedex, France, vol. SA WG2, No. Dubrovnik, Croatia, Jul. 6, 2015-Jul. 10, 2015, Jul. 10, 2015, XP050988284, Jul. 6-10, 2015, 10 Pages, Dubrovnik, Croatia, pp. 1-4, pp. 6-8, p. 2, paragraph 2-p. 4, paragraph 2.1.2.

Ericsson: "Offline #506 Release Assistance", R2-1914058, 3GPP TSG-RAN2 Meeting #107bis Chongqing, China, Oct. 14-18, 2019, pp. 1-8.

Qualcomm Inc: "Procedure for Efficient Transition out of RRC_Connected", R2-1911301, 3GPP TSG-RAN WG2 Meeting #107 Prague, Czech, Aug. 26-30, 2019, pp. 1-2.

European Search Report—EP251791992—Search Authority—Berlin—Aug. 19, 2025.

* cited by examiner

RRC Connected Lite Mode

400

Communications Manager

UE Capability Manager

620

Receiver          Configuration Manager          Transmitter 610          625          635

Grantless Communication
Manager

630

615

605

600

910

915

920

905

900

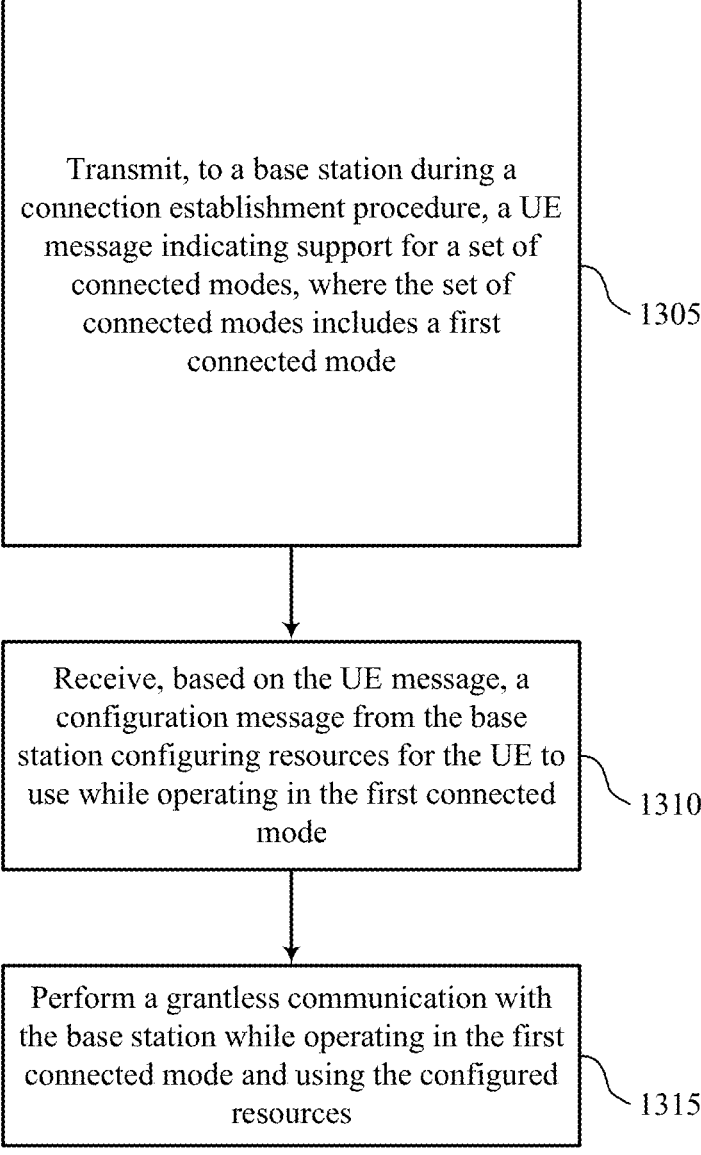

Transmit, to a base station during a connection establishment procedure, a UE message indicating support for a set of connected modes, where the set of connected modes includes a first connected mode

1305

Receive, based on the UE message, a configuration message from the base station configuring resources for the UE to use while operating in the first connected mode

1310

Perform a grantless communication with the base station while operating in the first connected mode and using the configured resources

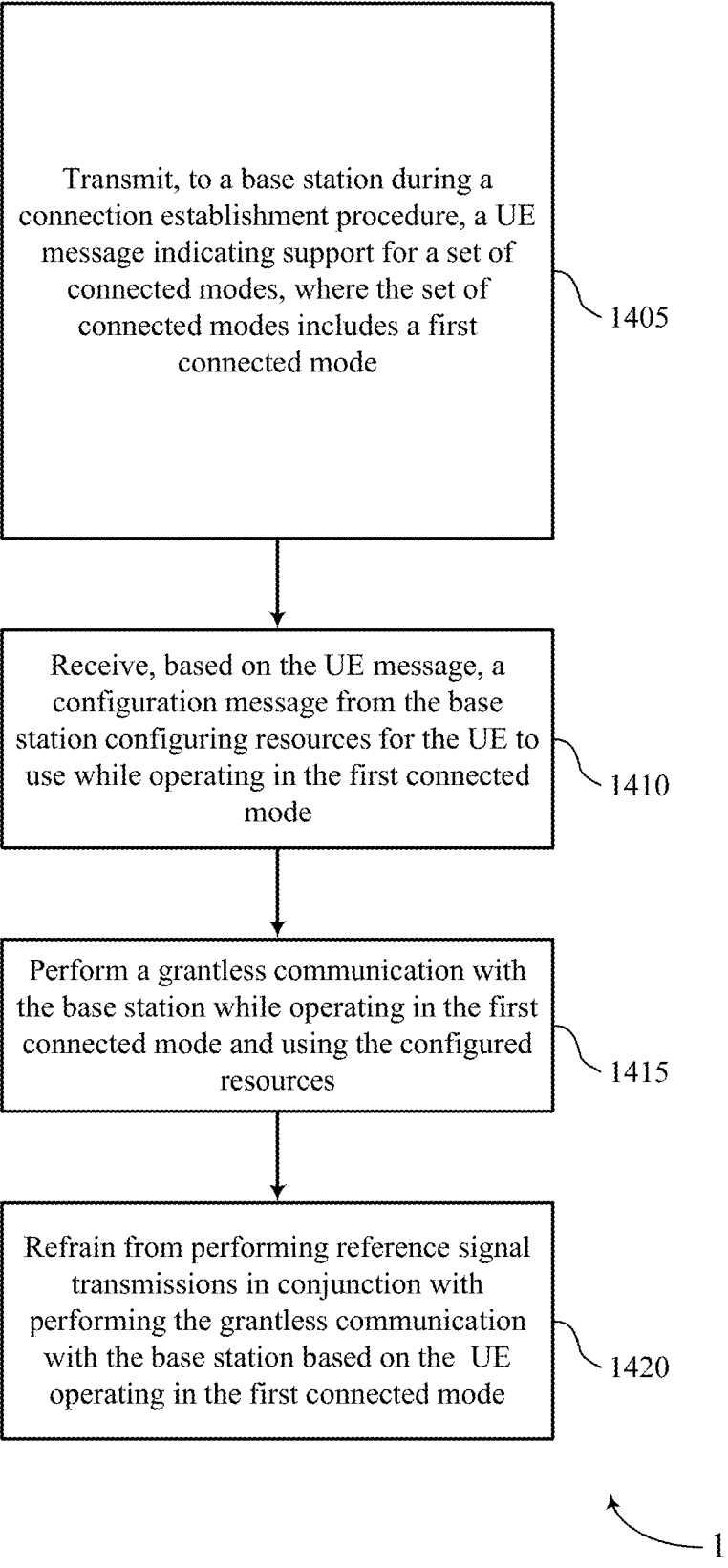

Transmit, to a base station during a
connection establishment procedure, a UE
message indicating support for a set of
connected modes, where the set of
connected modes includes a first
connected mode

1405

Receive, based on the UE message, a
configuration message from the base
station configuring resources for the UE to
use while operating in the first connected
mode

1410

Perform a grantless communication with
the base station while operating in the first
connected mode and using the configured
resources

1415

Refrain from performing reference signal
transmissions in conjunction with
performing the grantless communication
with the base station based on the UE
operating in the first connected mode

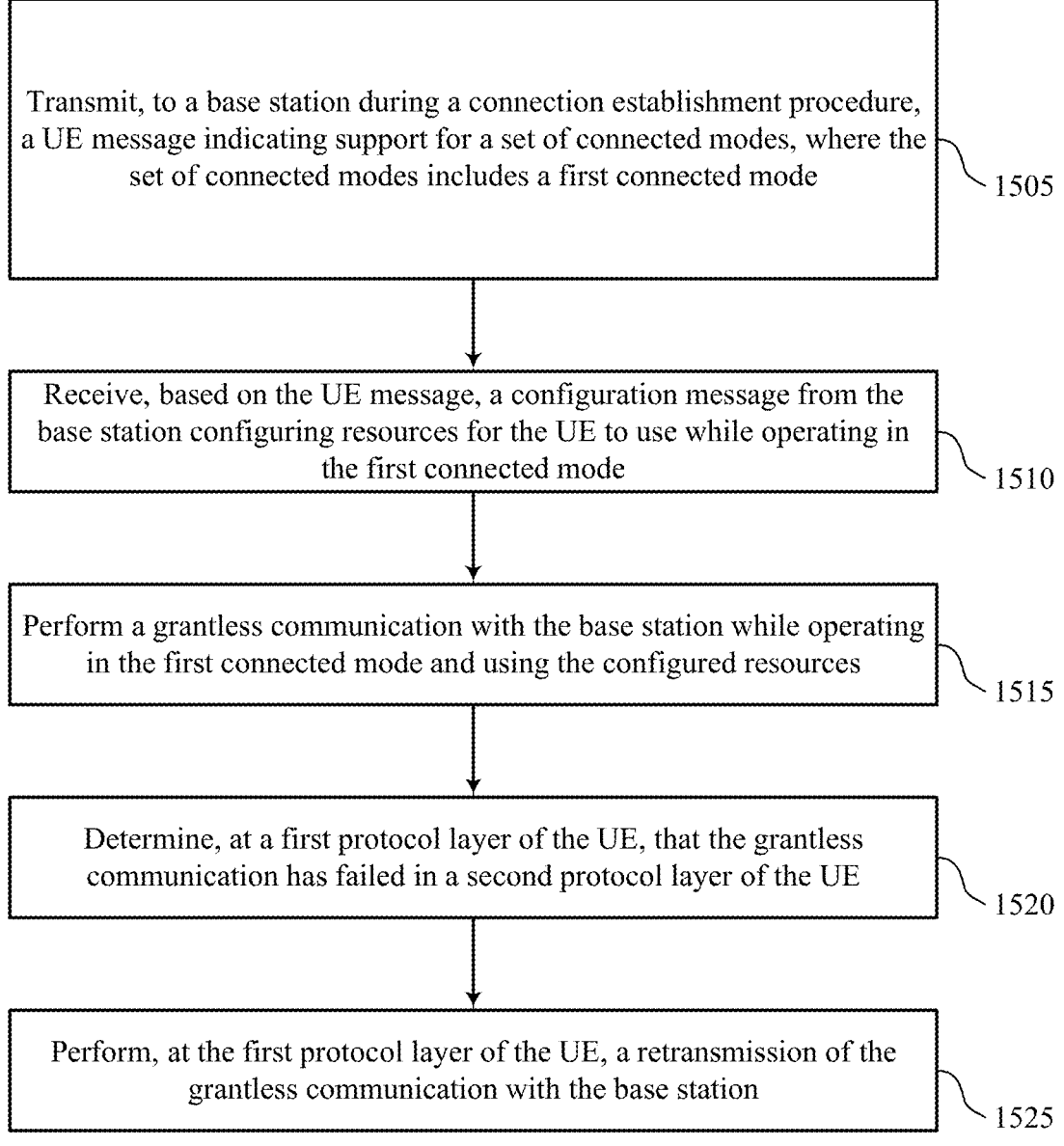

Transmit, to a base station during a connection establishment procedure, a UE message indicating support for a set of connected modes, where the set of connected modes includes a first connected mode

1505

Receive, based on the UE message, a configuration message from the base station configuring resources for the UE to use while operating in the first connected mode

1510

Perform a grantless communication with the base station while operating in the first connected mode and using the configured resources

1515

Determine, at a first protocol layer of the UE, that the grantless communication has failed in a second protocol layer of the UE

1520

Perform, at the first protocol layer of the UE, a retransmission of the grantless communication with the base station

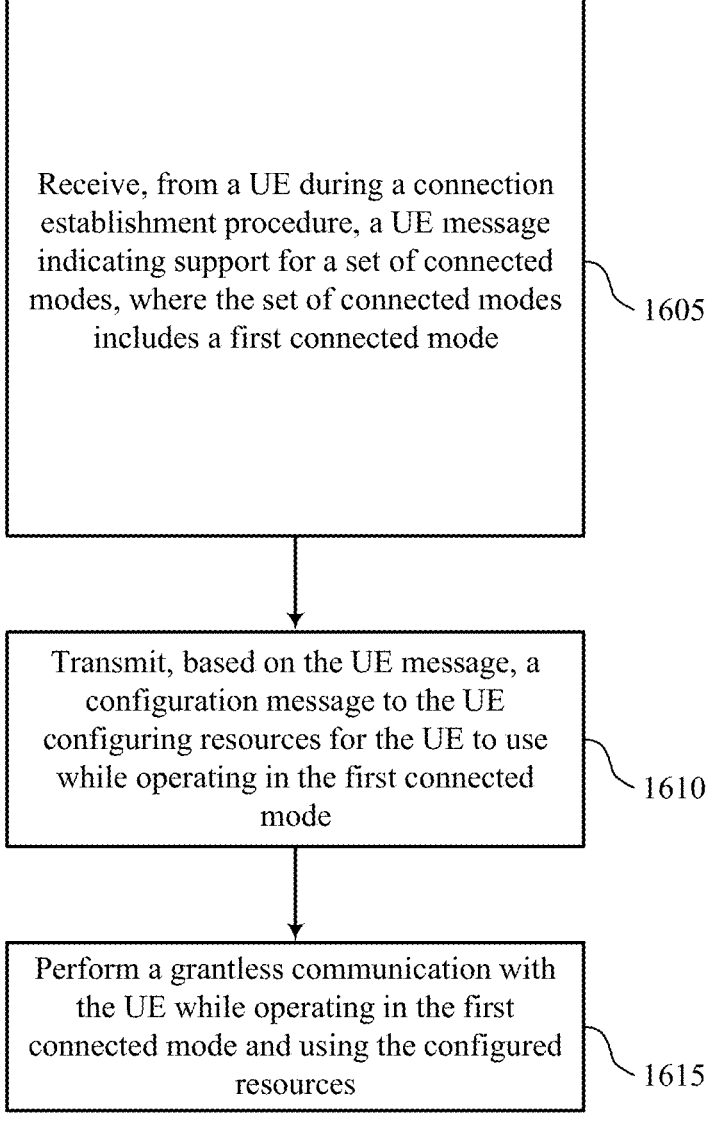

Receive, from a UE during a connection establishment procedure, a UE message indicating support for a set of connected modes, where the set of connected modes includes a first connected mode

1605

Transmit, based on the UE message, a configuration message to the UE configuring resources for the UE to use while operating in the first connected mode

1610

Perform a grantless communication with the UE while operating in the first connected mode and using the configured resources

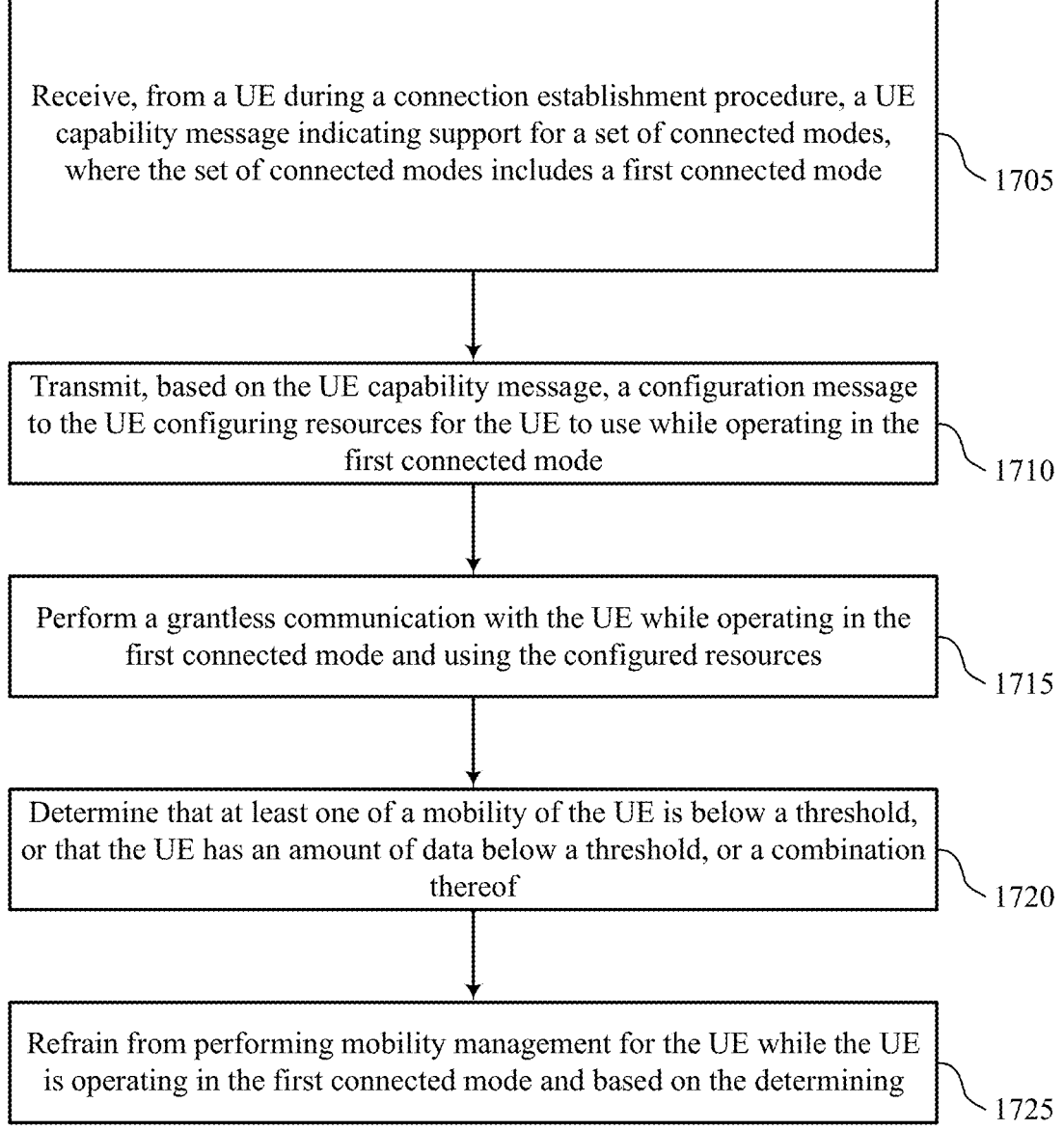

Receive, from a UE during a connection establishment procedure, a UE capability message indicating support for a set of connected modes, where the set of connected modes includes a first connected mode — 1705

Transmit, based on the UE capability message, a configuration message to the UE configuring resources for the UE to use while operating in the first connected mode — 1710

Perform a grantless communication with the UE while operating in the first connected mode and using the configured resources — 1715

Determine that at least one of a mobility of the UE is below a threshold, or that the UE has an amount of data below a threshold, or a combination thereof — 1720

Refrain from performing mobility management for the UE while the UE is operating in the first connected mode and based on the determining — 1725

METHODS FOR POWER-EFFICIENT TRANSFER OF SMALL DATA IN RADIO RESOURCE CONTROL CONNECTED LITE MODE

CROSS REFERENCE

The present Application for Patent is a Continuation of U.S. patent application Ser. No. 17/077,957 by H E et al., entitled "METHODS FOR POWER-EFFICIENT TRANS-FER OF SMALL DATA IN RADIO RESOURCE CON-TROL CONNECTED LITE MODE" filed Oct. 22, 2020, which claims the benefit of U.S. Provisional Patent Appli-cation No. 62/925,984 by HE et al., entitled "METHODS FOR POWER-EFFICIENT TRANSFER OF SMALL DATA IN RADIO RESOURCE CONTROL CONNECTED LITE MODE," filed Oct. 25, 2019, assigned to the assignee hereof, and expressly incorporated by reference in its entirety herein.

TECHNICAL FIELD

The following relates generally to wireless communica-tions, and more specifically to methods for power-efficient transfer of small data in radio resource control (RRC) connected lite mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplex-ing (DFT-S-OFDM). A wireless multiple-access communi-cations system may include a number of base stations or network access nodes, each simultaneously supporting com-munication for multiple communication devices, which may be otherwise known as user equipment (UE).

SUMMARY

The described techniques relate to improved methods, systems, devices, and apparatuses that support methods for power-efficient transfer of small data in radio resource control (RRC) connected lite mode. Generally, the described techniques introduce a new RRC operational mode that reduces both power consumption and the cost of user equipment (UE) while saving considerable resources of the wireless network. The new RRC operational mode may be referred to as an RRC connected lite mode that configures resources to be used for grantless communications while operating in the RRC connected lite mode, but without many of the complicated and resource-intensive configurations associated with the RRC connected mode. The RRC con-nected lite mode may be based, at least in some aspects, on the UE capability, the UE's communication requirements, and the like. For example, the UE may signal its support for various RRC modes in a UE message (e.g., a capability message), e.g., during an RRC connection establishment procedure between the UE and base station. This may include an indication of support or in some cases, a prefer-ence for the RRC connected lite mode (e.g., a first connected mode) for grantless resource scheduling. Broadly, the RRC connected lite mode omits one, some, and in some examples most, of the features configured for a UE operating in an RRC connected mode. For example, the RRC connected lite mode may omit (e.g., not configure) control channel(s), acknowledgments feedback reporting, mobility manage-ment functions, channel performance measurement and reporting, and the like, for the UE and base station while the UE operates in the RRC connected lite mode. This approach drastically reduces the complexity/cost of the UE (e.g., simplifies communication circuitry, or reduces component cost), minimizes resources configured for the UE, and overall improves communications for the UE and base station. Based on the UE message, the base station may configure the UE with resources for the UE to use while operating in the RRC connected lite mode (e.g., the first connected mode). Accordingly, the UE and base station may perform grantless communications (e.g., uplink or down-link, or both) while the UE operates in the RRC connected lite mode.

A method of wireless communication at a UE is described. The method may include transmitting, to a base station during a connection establishment procedure, a UE message indicating support for a set of connected modes, where the set of connected modes includes a first connected mode, receiving, based on the UE message, a configuration message from the base station configuring resources for the UE to use while operating in the first connected mode, and performing a grantless communication with the base station while operating in the first connected mode and using the configured resources.

An apparatus for wireless communication at a UE is described. The apparatus may include a processor, memory coupled (e.g., operatively, communicatively, functionally, electronically, or electrically) to the processor, and instruc-tions stored in the memory. The instructions may be execut-able by the processor to cause the apparatus to transmit, to a base station during a connection establishment procedure, a UE message indicating support for a set of connected modes, where the set of connected modes includes a first connected mode, receive, based on the UE message, a configuration message from the base station configuring resources for the UE to use while operating in the first connected mode, and perform a grantless communication with the base station while operating in the first connected mode and using the configured resources.

Another apparatus for wireless communication at a UE is described. The apparatus may include means for transmit-ting, to a base station during a connection establishment procedure, a UE message indicating support for a set of connected modes, where the set of connected modes includes a first connected mode, receiving, based on the UE message, a configuration message from the base station configuring resources for the UE to use while operating in the first connected mode, and performing a grantless com-munication with the base station while operating in the first connected mode and using the configured resources.

A non-transitory computer-readable medium storing code for wireless communication at a UE is described. The code may include instructions executable by a processor to transmit, to a base station during a connection establishment procedure, a UE message indicating support for a set of connected modes, where the set of connected modes includes a first connected mode, receive, based on the UE message, a configuration message from the base station configuring resources for the UE to use while operating in the first connected mode, and perform a grantless communication with the base station while operating in the first connected mode and using the configured resources.

In some examples of the method, apparatuses, and non-transitory computer-readable medium described herein, the first connected mode may be associated with grantless resource scheduling and free of at least one of acknowledgment feedback messaging, or a configured control channel, or mobility management, or channel performance measurement and reporting, or a combination thereof.

Some examples of the method, apparatuses, and non-transitory computer-readable medium described herein may further include operations, features, means, or instructions for configuring the UE message to identify the first connected mode as a preferred connected mode of the UE.

Some examples of the method, apparatuses, and non-transitory computer-readable medium described herein may further include operations, features, means, or instructions for refraining from performing reference signal transmissions in conjunction with performing the grantless communication with the base station based on the UE operating in the first connected mode.

Some examples of the method, apparatuses, and non-transitory computer-readable medium described herein may further include operations, features, means, or instructions for determining, at a first protocol layer of the UE, that the grantless communication may have failed in a second protocol layer of the UE, and performing, at the first protocol layer of the UE, a retransmission of the grantless communication with the base station.

Some examples of the method, apparatuses, and non-transitory computer-readable medium described herein may further include operations, features, means, or instructions for determining that at least one of a mobility of the UE may be below a threshold, or that the UE may have an amount of data below a threshold, or a combination thereof, and refraining from performing mobility management while operating in the first connected mode and based on the determining.

Some examples of the method, apparatuses, and non-transitory computer-readable medium described herein may further include operations, features, means, or instructions for transitioning from the first connected mode to a second connected mode based on expiry of an RRC connection lease, or expiry of a data inactivity timer, or upon receipt of a signal indicating for the UE to transition from the first connected mode to the second connected mode, or a combination thereof.

In some examples of the method, apparatuses, and non-transitory computer-readable medium described herein, the UE message may be transmitted as part of a random access channel (RACH) message A (msgA), or a RACH message 3 (msg3), or a UE assistance information message, or a combination thereof.

In some examples of the method, apparatuses, and non-transitory computer-readable medium described herein, the grantless communication includes uplink communication, downlink communication, or a combination thereof.

In some examples of the method, apparatuses, and non-transitory computer-readable medium described herein, the first connected mode includes an RRC inactive mode, and the set of connected modes includes an RRC connected mode, an RRC connected lite mode, the RRC inactive mode, and an RRC idle mode.

In some examples of the method, apparatuses, and non-transitory computer-readable medium described herein, the configured control channel includes at least one of a physical downlink control channel (PDCCH), or a physical uplink control channel (PUCCH), or a combination thereof.

In some examples of the method, apparatuses, and non-transitory computer-readable medium described herein, the configured resources include at least one of a semi-persistent scheduling (SPS) resources for grantless downlink communications, or a configured grant (CG) for grantless uplink communications, or a combination thereof.

In some examples of the method, apparatuses, and non-transitory computer-readable medium described herein, the UE message includes an RRC resume message of a RACH msg3.

Some examples of the method, apparatuses, and non-transitory computer-readable medium described herein may further include operations, features, means, or instructions for transmitting, to the base station, information for scheduling subsequent data transmissions including one or more of a buffer status report, a preferred beam index, a beam measurement report, a power headroom report, a mobility state, or a combination thereof, where the information for scheduling subsequent data transmissions may be transmitted in one of a RACH msg3 or a RACH message 5 (msg5).

In some examples of the method, apparatuses, and non-transitory computer-readable medium described herein, one or more parameters associated with the configured resources may be received in a Release-Config message.

A method of wireless communication at a base station is described. The method may include receiving, from a UE during a connection establishment procedure, a UE message indicating support for a set of connected modes, where the set of connected modes includes a first connected mode, transmitting, based on the UE message, a configuration message to the UE configuring resources for the UE to use while operating in the first connected mode, and performing a grantless communication with the UE while operating in the first connected mode and using the configured resources.

An apparatus for wireless communication at a base station is described. The apparatus may include a processor, memory coupled (e.g., operatively, communicatively, functionally, electronically, or electrically) to the processor, and instructions stored in the memory. The instructions may be executable by the processor to cause the apparatus to receive, from a UE during a connection establishment procedure, a UE message indicating support for a set of connected modes, where the set of connected modes includes a first connected mode, transmit, based on the UE message, a configuration message to the UE configuring resources for the UE to use while operating in the first connected mode, and perform a grantless communication with the UE while operating in the first connected mode and using the configured resources.

Another apparatus for wireless communication at a base station is described. The apparatus may include means for receiving, from a UE during a connection establishment procedure, a UE message indicating support for a set of connected modes, where the set of connected modes includes a first connected mode, transmitting, based on the UE message, a configuration message to the UE configuring resources for the UE to use while operating in the first connected mode, and performing a grantless communication with the UE while operating in the first connected mode and using the configured resources.

A non-transitory computer-readable medium storing code for wireless communication at a base station is described. The code may include instructions executable by a processor to receive, from a UE during a connection establishment procedure, a UE message indicating support for a set of connected modes, where the set of connected modes includes a first connected mode, transmit, based on the UE message, a configuration message to the UE configuring resources for the UE to use while operating in the first connected mode, and perform a grantless communication with the UE while operating in the first connected mode and using the configured resources.

In some examples of the method, apparatuses, and non-transitory computer-readable medium described herein, the first connected mode may be associated with grantless resource scheduling and free of at least one of acknowledgment feedback messaging, or a configured control channel, or mobility management, or channel performance measurement and reporting, or a combination thereof.

Some examples of the method, apparatuses, and non-transitory computer-readable medium described herein may further include operations, features, means, or instructions for determining that the UE message identifies the first connected mode as a preferred connected mode for the UE.

Some examples of the method, apparatuses, and non-transitory computer-readable medium described herein may further include operations, features, means, or instructions for performing the grantless communication with the UE free of reference signal transmissions by the UE based on the UE operating in the first connected mode.

Some examples of the method, apparatuses, and non-transitory computer-readable medium described herein may further include operations, features, means, or instructions for determining that at least one of a mobility of the UE may be below a threshold, or that the UE may have an amount of data below a threshold, or a combination thereof, and refraining from performing mobility management for the UE while the UE may be operating in the first connected mode and based on the determining.

Some examples of the method, apparatuses, and non-transitory computer-readable medium described herein may further include operations, features, means, or instructions for transitioning the UE from the first connected mode to a second connected mode based on expiry of an RRC connection lease, or expiry of a data inactivity timer, or upon receipt of a signal indicating for the UE to transition from the first connected mode to the second connected mode, or a combination thereof.

In some examples of the method, apparatuses, and non-transitory computer-readable medium described herein, the UE message is transmitted as part of a RACH message A (msgA), or a RACH message 3 (msg3), or a UE assistance information message, or a combination thereof.

In some examples of the method, apparatuses, and non-transitory computer-readable medium described herein, the grantless communication includes uplink communication, downlink communication, or a combination thereof.

In some examples of the method, apparatuses, and non-transitory computer-readable medium described herein, the first connected mode includes an RRC inactive mode, and the set of connected modes includes an RRC connected mode, an RRC connected lite mode, the RRC inactive mode, and an RRC idle mode.

In some examples of the method, apparatuses, and non-transitory computer-readable medium described herein, the configured control channel includes at least one of a PDCCH, or a PUCCH, or a combination thereof.

In some examples of the method, apparatuses, and non-transitory computer-readable medium described herein, the configured resources include at least one of a semi-persistent scheduling (SPS) resources for grantless downlink communications, or a configured grant (CG) for grantless uplink communications, or a combination thereof.

In some examples of the method, apparatuses, and non-transitory computer-readable medium described herein, the UE message includes an RRC resume message of a RACH msg3.

Some examples of the method, apparatuses, and non-transitory computer-readable medium described herein may further include operations, features, means, or instructions for receiving, from the UE, information for scheduling subsequent data transmissions including one or more of a buffer status report, a preferred beam index, a beam measurement report, a power headroom report, a mobility state, or a combination thereof, where the information for scheduling subsequent data transmissions may be transmitted in one of a RACH msg3 or a RACH message 5 (msg5).

In some examples of the method, apparatuses, and non-transitory computer-readable medium described herein, one or more parameters associated with the configured resources may be received in a Release-Config message.

BRIEF DESCRIPTION OF THE DRAWINGS

FIGS. 13 through 17 show flowcharts illustrating methods that support methods for power-efficient transfer of small data in RRC connected lite mode in accordance with aspects of the present disclosure.

DETAILED DESCRIPTION

Figure 1:
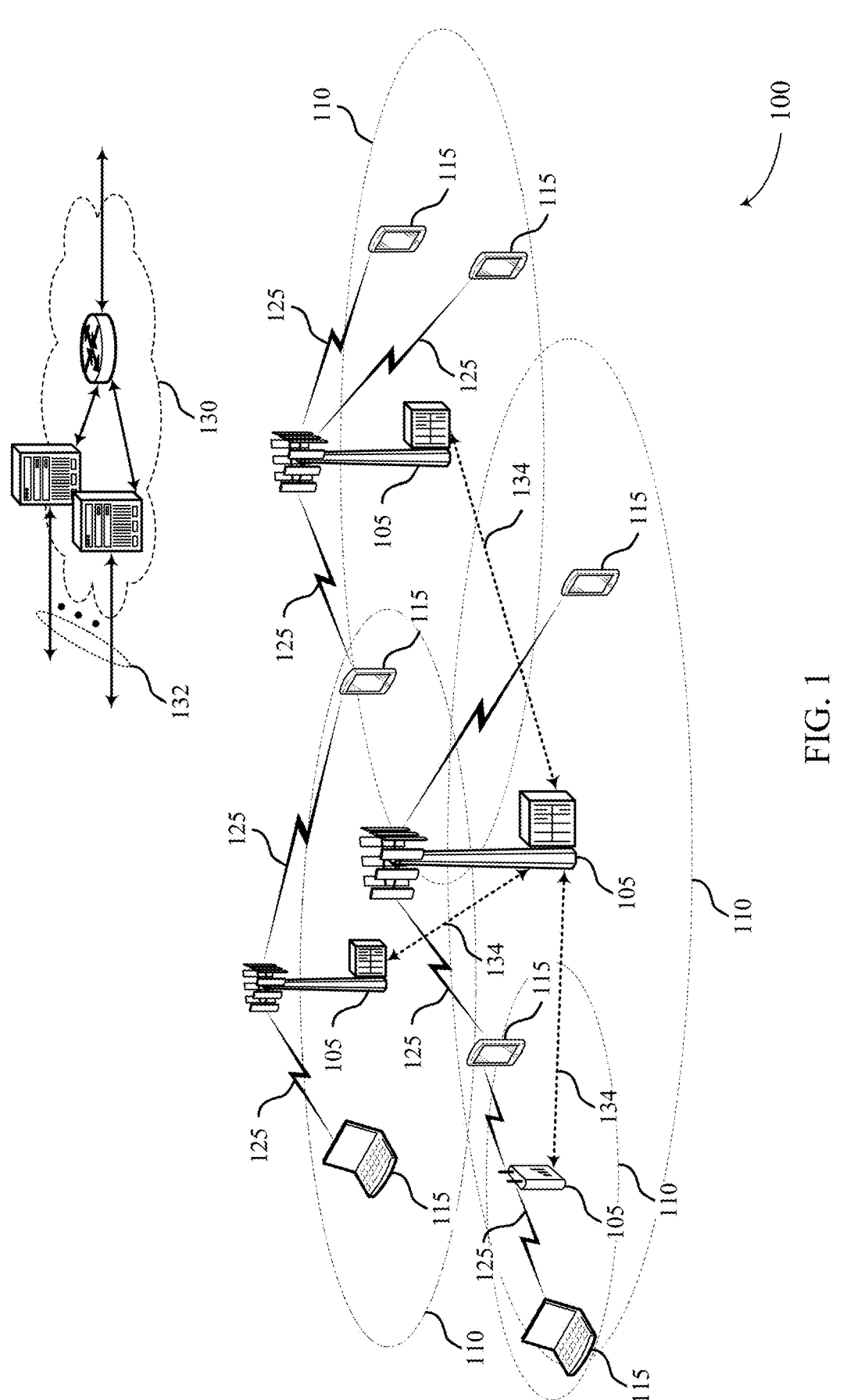
FIG. 1 illustrates an example of a system for wireless communications that supports methods for power-efficient transfer of small data in radio resource control (RRC) connected lite mode in accordance with aspects of the present disclosure.

User equipment (UE) operating in a wireless communication system may operate in a radio resource control (RRC) connected mode, an RRC inactive mode, and an RRC idle mode. The RRC connected mode may be associated with a full set of control channels, channel performance measurement and reporting, acknowledgment feedback messaging, and the like, being configured for the UE (which can exhaust considerable resources and increase complexity/cost of the UE). In the RRC idle mode, the UE powers down various components to conserve power while the base station releases most of the resources configured for the UE. In the RRC inactive mode, the network and UE may maintain some degree of context (e.g., access stratum context) which is used to more quickly transition the UE to an RRC connected mode should there be data to communicate. While these RRC modes support many operations, they are limited in that they do not provide the flexibility warranted by some types of UEs, by some types of wireless communication needs, and the like.

Aspects of the disclosure are initially described in the context of a wireless communications system. The described techniques relate to improved methods, systems, devices, and apparatuses that support methods for power-efficient transfer of small data in RRC connected lite mode. Generally, the described techniques introduce a new RRC operational mode that reduces both power consumption and the cost of UE. The new RRC operational mode may be referred to as an RRC connected lite mode that configures resources to be used for a grantless communications while the UE is operating in the RRC connected lite mode, but without many of the complicated and resource-intensive configurations associated with the RRC connected mode. The RRC connected lite mode may be based, at least in some aspects, on the UE capability, the UE's communication requirements, and the like. For example, the UE may signal its support for various RRC modes in a UE message (e.g., a UE capability message), e.g., during an RRC connection establishment procedure between the UE and base station. This may include an indication of support for the RRC connected lite mode (e.g., a first connected mode) for grantless resource scheduling. Broadly, the RRC connected lite mode omits some or many of the features sometimes configured for a UE operating in an RRC connected mode. For example, the RRC connected lite mode may omit (e.g., not configure) control channel(s), acknowledgment feedback reporting, mobility management, channel performance measurement and reporting, and the like, for the UE and base station while the UE operates in the RRC connected lite mode. This approach drastically reduces the complexity/cost of the UE (e.g., simplifies communication circuitry, or reduces component cost), minimizes resources configured for the UE, and overall improves communications for the UE, base station, and wireless network. Based on the UE message indicating a preference, or capability, or both, the base station may configure the UE with resources for the UE to use while operating in the RRC connected lite mode (e.g., the first connected mode), e.g., such as semi-persistent scheduling (SPS) resources for grantless downlink communications or configured grant (CG) resources for grantless uplink communications, or both. Accordingly, the UE and base station may perform grantless communications while the UE operates in the RRC connected lite mode.

Aspects of the disclosure are further illustrated by and described with reference to apparatus diagrams, system diagrams, and flowcharts that relate to methods for power-efficient transfer of small data in RRC connected lite mode.

FIG. 1 illustrates an example of a wireless communications system 100 that supports methods for power-efficient transfer of small data in RRC connected lite mode in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a multimedia/entertainment device (e.g., a radio, a MP3 player, or a video device), a camera, a gaming device, a navigation/positioning device (e.g., GNSS (global navigation satellite system) devices based on, for example, GPS (global positioning system), Beidou, GLONASS, or Galileo, a terrestrial-based device), a tablet computer, a laptop computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, CAT M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), and mMTC (massive MTC), and NB-IoT may include eNB-IoT (enhanced NB-IoT) and FeNB-IoT (further enhanced NB-IoT).

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, sometimes in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples, a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ)

to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $T_f=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, or 80 MHz) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may transmit, to a base station 105 during a connection establishment procedure, a UE message indicating support for a plurality of connected modes, where the plurality of connected modes comprises a first connected mode (e.g., an RRC connected lite mode, an RRC inactive mode, or the like). In some examples, the first connected mode may be associated with grantless resource scheduling and free of at least one of acknowledgment feedback messaging, or a configured control channel, or mobility management, or channel performance measurement and reporting, or a combination thereof. The UE 115 may receive, based at least in part on the UE message, a configuration message from the base station 105 configuring resources for the UE 115 to use while operating in the first connected mode. The UE 115 may perform a grantless communication with the base station 105 while operating in the first connected mode and using the configured resources.

A base station 105 may receive, from a UE 115 during a connection establishment procedure, a UE message indicating support for a plurality of connected modes, where the plurality of connected modes comprises a first connected mode (e.g., an RRC connected lite mode), In some examples, the first connected mode may be associated with grantless resource scheduling and free of at least one of acknowledgment feedback messaging, or a configured control channel, or mobility management, or channel performance measurement and reporting, or a combination thereof. The base station 105 may transmit, based at least in part on the UE message, a configuration message to the UE 115 configuring resources for the UE 115 to use while operating in the first connected mode. The base station 105 may perform a grantless communication with the UE 115 while operating in the first connected mode (e.g., while UE 115 operates in the first connected mode) and using the configured resources.

Figure 2:
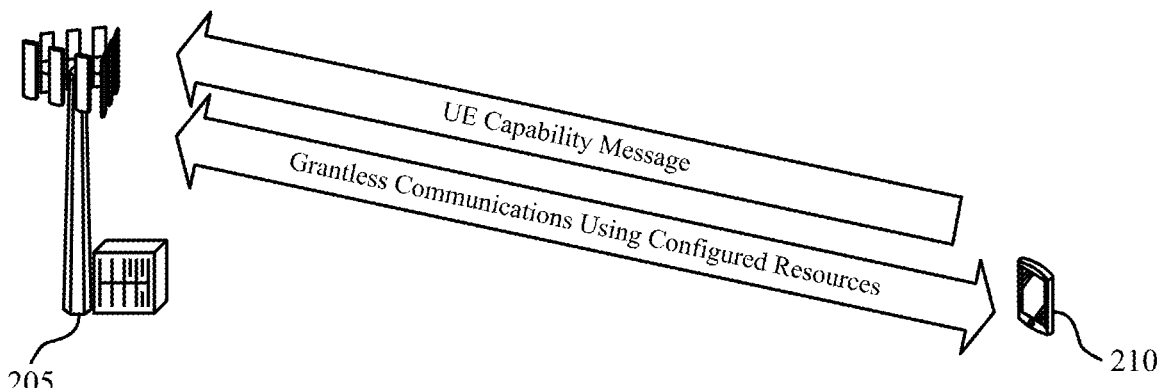
FIG. 2 illustrates an example of a wireless communication system that supports methods for power-efficient transfer of small data in RRC connected lite mode in accordance with aspects of the present disclosure.

FIG. 2 illustrates an example of a wireless communications system 200 that supports methods for power-efficient transfer of small data in RRC connected lite mode in accordance with aspects of the present disclosure. In some examples, wireless communications system 200 may implement aspects of wireless communications system 100. Wireless communications system 200 may include base station 205 and UE 210, which may be examples of the corresponding devices described herein.

In some wireless communication systems, UE 210 may to establish an RRC connection (e.g., transition to an RRC connected mode) in order to exchange data with the network (e.g., via base station 205). The RRC connection may include UE 210 being configured with control channels (e.g., PDCCH or PUCCH, or both) to support the data exchange. For example, the PDCCH may be used for UE 210 to receive scheduling information on its downlink assignment and uplink grants. The PUCCH may be used for UE 210 to request an uplink grant, send HARQ feedback for downlink data, or to provide a channel state information (CSI) report for link adaptation. Additionally, to support mobility management, the network may configure UE 210 with measurement objects (e.g., CSI) to monitor the link quality of both serving and neighboring cells, which is both time and power consuming.

However, this model may be unnecessary in some scenarios. For example, when UE 210 has a small amount of data to send/receive, when the data rate is low, when UE 210 is stationary or has low mobility, then UE 210 may not need to have the full ensemble of resources, functions, or channels configured. Accordingly, aspects of the described techniques introduce an RRC connected lite mode (e.g., a first connected mode) with a simplified configuration that saves time in setting up the configuration for a data exchange. The full configuration (e.g., when transitioning to an RRC connected mode) can be a significant overhead for a connection of a short duration (e.g., for a small data transfer). The low overhead savings of the RRC connected lite mode improves UE 210 power savings, reduce cost, and conserve valuable over-the-air and time resources.

Initially, UE 210 may transmit (and base station 205 may receive) a UE message during a connection establishment procedure. For example, the UE message may be transmitted during an RRC connection establishment procedure between UE 210 the base station 205. The UE message may carry or otherwise convey an indication for a plurality (e.g., one or more) of connected modes (e.g., RRC modes) supported by UE 210. This may include support for a first connected mode, which may be referred to as an RRC connected lite mode that is used for, or otherwise associated with, grantless resource scheduling for UE 210. This may also include the first connected mode (e.g., the RRC connected lite mode) being free from (e.g., without being configured with) acknowledgment feedback messaging (e.g., HARQ reporting), control channels (e.g., PDCCH or PUCCH, or both), mobility management functions (e.g., in some scenarios where the UE has low mobility), channel performance measurement and reporting (e.g., CSI/sounding reference signal (SRS)), and the like. UE 210 may indicate the support for the first connected mode to the network during the connection establishment procedure in a random access channel (RACH) message A (msgA) transmission, a RACH message 1 (msg1) transmission, a RACH message 3 (msg3) transmission, in a UE assistance information transmission, and the like, during the connection establishment procedure. In some examples, UE 210 may indicate the support for the first connected mode to the network during the connection establishment procedure in an RRC resume message of a RACH msg3. In some aspects, the UE 210 may configure the UE message to identify or otherwise indicate that the first connected mode is a preferred connected mode for UE 210. Additionally or alternatively, the UE 210 may transmit information for scheduling subsequent data transmissions including one or more of a buffer status report, a preferred beam index, a beam measurement report, a power headroom report, a mobility state. In some examples, the information for scheduling subsequent data transmissions may be transmitted in a RACH msg3 or a RACH message 5 (msg5). Accordingly, wireless communications system 200 may support the RRC connected lite mode for UE 210, e.g., based on the UE message.

Base station 205 may receive the UE message indicating support for the first connected mode (e.g., the RRC connected lite mode) and respond by transmitting or otherwise providing an indication of a configuration message to UE 210 configuring resources for UE 210 to use while operating in the first connected mode. The configured resources may be uplink resources (e.g., CG resources) or downlink resources (e.g., SPS resources), or both. In some cases, the base station may transmit one or more parameters associated with the configured resources in a Release-Config message. Additionally or alternatively, the base station may configure the resources based on receiving the buffer status report, the preferred beam index, the beam measurement report, the power headroom report, the mobility state, or a combination thereof.

UE 210 and base station 205 may perform grantless communications while UE 210 operates in the first connected mode (e.g., the RRC connected lite mode) using the configured resources. That is, UE 210 may transmit/receive data over a preconfigured periodic downlink/uplink resources (e.g., downlink SPS and type-1 CG resources), which are activated upon configuration. In some aspects, a new type of downlink SPS may be configured whose activation is based upon configuration, e.g., automatically activated when configured. Transmissions over the configured resources may avoid the need for dynamic scheduling (e.g., downlink control information scheduling), so that there may be no need for UE 210 to be configured with control channel(s) (e.g., PDCCH or PUCCH, or both).

Moreover, the first connected mode (e.g., the RRC connected lite mode) may be free of acknowledgment feedback messaging (e.g., ACK/NACK reporting). That is, there may be no HARQ procedure applied to the transmissions/receptions performed by UE 210 in the grantless communications. To account for the impact on the reliability, some or all of the downlink SPS and uplink CG communications may be configured with repetition. If the physical layer (e.g., a second layer) transmission still fails, retransmissions may be handled by the RRC protocol layer (e.g., a first layer) of UE 210 following RLC ARQ procedures.

As discussed, the first connected mode (e.g., the RRC connected lite mode) may be free of (e.g., may not be configured) some channels/procedures. As one example, UEs that are stationary or have low mobility may omit mobility management procedures. Additionally or alternatively, UEs having a small amount of data to send may omit radio resource management (RRM) procedures. Additionally or alternatively, UEs having a small amount of data to send may not perform either CSI or SRS transmissions, or both. That is, UEs may not perform channel performance measurement and reporting (e.g., CSI-RS measurements or CSI reporting during the downlink grantless communications or SRS transmissions during the uplink grantless communications).

Accordingly, aspects of the described techniques reduce both power consumption and the cost of UE 210. Aspects of the described techniques may be implemented when UE 210 is a certain type or class of UE, such as a wearable device, an MTC device, or an IoE device. In terms of power reduction, the RRC connected lite mode may get rid of (e.g., be free of) PDCCH, as PDCCH monitoring may be one of the more power expensive procedures. This may simplify the RRC configuration by not configuring unnecessary channels or procedures. The simplified RRC configuration saves time during the RRC set up, which can be a significant overhead for a connection of short duration (e.g., in a small data transfer). The low overhead may save UE 210 power as well. In terms of cost-reduction, the RRC connected lite mode may eliminate the HARQ procedure, which may require PDCCH or PUCCH. The HARQ buffer can make up a significant part of the chip memory of UEs, as the memory is a major cost component of the chip. A large HARQ buffer also consumes additional power during the discontinuous reception (DRX) operations by shifting buffered data in and out of cache.

Generally, UE 210 may switch between the first connected mode (e.g., the RRC connected lite mode) and one or more of the other supported connected modes (e.g., an RRC connected mode), or vice versa. During the connection, the network may RRC reconfigure UE 210 to the regular RRC connected mode, and vice versa. With regards to switching between other RRC modes or states, the RRC connected lite mode may be considered just one form of RRC operational modes, so the same state (or mode) transition procedures may be applied, e.g., based on either RRC connection lease, expiry of a data inactivity timer, upon receipt of a signal indicating for the UE to transition from the first connected mode to the second connected mode (e.g., in response to the UE requesting the network to switch between the connection types).

Although the above techniques are described with reference to the new RRC connected lite mode, it is to be understood that these techniques can also be implemented by modifying one or more of the existing RRC connected modes (e.g., RRC connected mode or RRC inactive mode). Moreover, the describes techniques may also be implemented outside of the context of an RRC mode.

As one non-limiting example, some types or classes of UE may automatically support the described techniques during an RRC connected mode. That is, in the UE message conveyed during the initial connection establishment procedure, the UE may signal that it is a certain UE type or class to the base station. Based on the particular UE type or class, the base station configuring the UE with an RRC connected mode may use configured resources for grantless communications, but free from control channels, mobility management, or HARQ processes.

In another non-limiting example, aspects of the described techniques may be implemented based on UE 210 signaling that it has a small amount of data to communicate to base station 205. For example, base station 205 and UE 210 may be configured such that, when a small amount of data is being communicated, the described techniques are adopted for UE 210 and base station 205 while communicating the small amount of data (e.g., on a temporary or per-small data communication basis).

Figure 3:
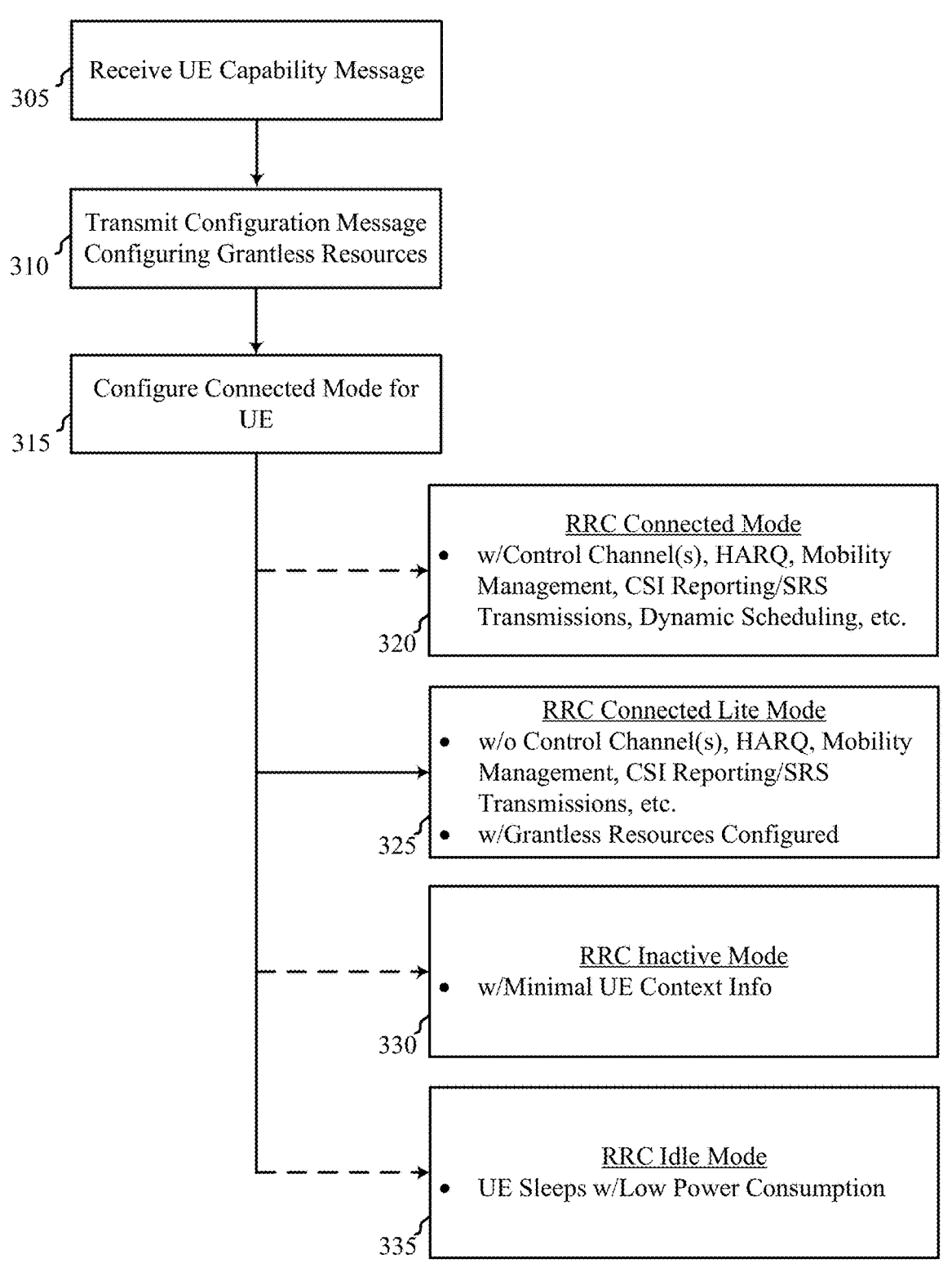
FIG. 3 illustrates an example of a process that supports methods for power-efficient transfer of small data in RRC connected lite mode in accordance with aspects of the present disclosure.

FIG. 3 illustrates an example of a process 300 that supports methods for power-efficient transfer of small data in RRC connected lite mode in accordance with aspects of the present disclosure. In some examples, process 300 may implement aspects of wireless communications systems 100 or 200. Aspects of process 300 may be implemented by a UE or base station, or both, which may be examples of the corresponding devices described herein.

At 305, the base station may receive a UE message transmitted from the UE during a connection establishment procedure. The UE message may carry or otherwise convey an indication of support for a plurality of connected modes (e.g., a plurality of RRC operational modes). For example, the UE message may carry or otherwise convey an indication of support for a first connected mode, In some examples, the first connected mode may be associated with grantless resource scheduling for the UE. The first connected node may be referred to as an RRC connected lite mode. The first connected mode may include the UE not being configured with or otherwise supporting (e.g., be free of) acknowledgment feedback messaging (e.g., HARQ processes), configured control channel(s) (e.g., PUCCH or PDCCH, or both), mobility management, or channel performance measurement and reporting (e.g., CSI/SRS). The UE may transmit or otherwise convey the UE message in a RACH message, such as a RACH msgA, RACH msg1 or msg3, or a UE assistance information message. The UE message may be included in an RRC resume message of a RACH msg3. In some examples, the UE may transmit information for scheduling subsequent data transmissions comprising one or more of a buffer status report, a preferred beam index, a beam measurement report, a power headroom report, a mobility state, or a combination thereof, where the information for scheduling subsequent data transmissions may be transmitted in one of a RACH msg3 or a RACH msg5. The other connected modes in the plurality of connected modes may include, but are not limited to, an RRC connected mode, an RRC inactive mode, an RRC idle mode, and the like.

At 310, the base station may transmit or otherwise convey an indication of a configuration message to the UE configuring resources for the UE to use while operating in the first connected mode (e.g., the RRC connected lite mode). The configured resources may be SPS resources (e.g., for grantless downlink communications) or CG resources (e.g., for grantless uplink communications). In some aspects, the base station may configure the resources for the UE to use while operating in the first connected mode based on the UE message. That is, the base station may configure the resources for grantless communications while operating in the first connected mode if the UE message indicates support for the first connected mode of the UE. In some cases, one or more parameters associated with the configured resources may be received in a Release-Config message At 315, the base station may configure the UE for operating in at least one connected mode of the plurality of connected modes. In the example illustrated in process 300, this may include the UE being configured for operating in the RRC connected lite mode (e.g., the first connected mode). Accordingly and at 325, the base station may configure the UE to operate in the first connected mode. In some examples, the first connected mode may be associated with grantless resource scheduling for the UE and free of acknowledgment feedback messaging, configured control channel, mobility management, or channel performance measurement and reporting. In some aspects, the base station may configure the UE to operate in the first connected mode based on the UE message indicating support, based on the base station determining that the UE has a small amount of data to communicate, that the UE has no or low mobility, and the like. Accordingly, the base station and UE may perform grantless communications while operating in the first connected mode (e.g., the RRC connected lite mode) and using the configured resources.

In some aspects, the UE may transition between the various connected modes of the plurality of connected modes. As one example, at 320 the UE may transition to an RRC connected mode where the UE stores the access stratum context information, has network controlled handover and measurements, uses a connected mode DRX configured by the base station, supports CA/dual connectivity (DC), supports CSI feedback, and the like. As another example and at 330, the UE may transition to an RRC inactive mode where the UE is configured such that cell reselection is supported, the monitoring of paging messages configured by the network is initiated, the UE may acquire SIB(s) from the base station, the UE stores access stratum context information, and the like. As another option and at 335, the UE may transition to an RRC idle mode where the UE is configured for idle mode DRX operations, cell reselection, paging configured by the network, and the like.

However, it is to be understood that in the situation where the UE indicates that the UE does not support the first connected mode (e.g., the RRC connected lite mode, the RRC inactive mode, or the like) or the scenario does not warrant the full RRC connected mode (e.g., due to small data communications), the base station may configure the UE to operate in the RRC connected mode at 320, the RRC inactive mode at 330, or the RRC idle mode at 335.

The UE may transition from one connected mode to the next based on an RRC connection release expiring, expiration of the data inactivity timer, an RRC connection release message, upon receipt of a signal indicating for the UE to transition from the first connected mode to the second connected mode (e.g., in response to the UE requesting the network to transition between modes), and the like.

Figure 4:
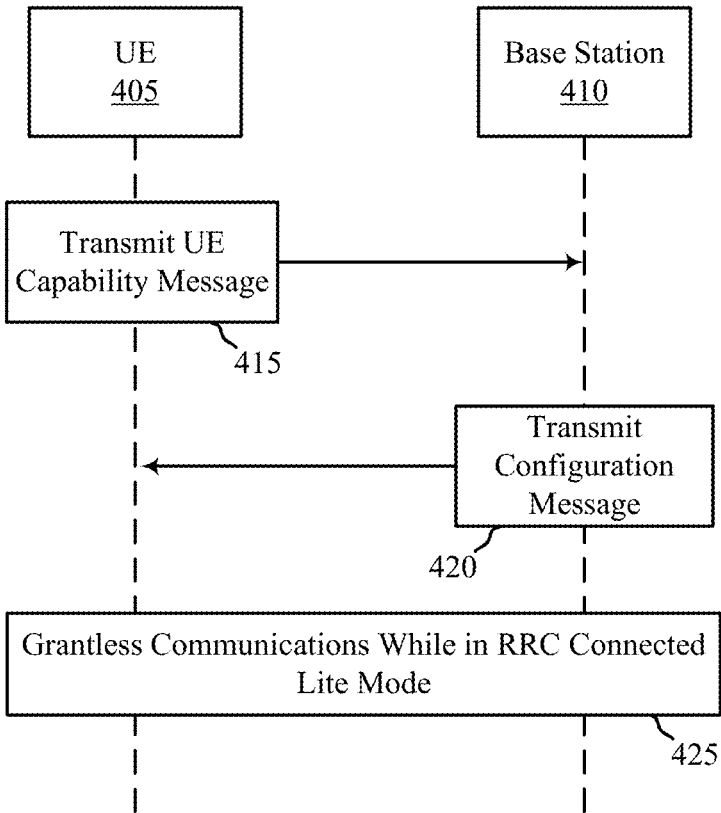
FIG. 4 illustrates an example of a process that supports methods for power-efficient transfer of small data in RRC connected lite mode in accordance with aspects of the present disclosure.

FIG. 4 illustrates an example of a process 400 that supports methods for power-efficient transfer of small data in RRC connected lite mode in accordance with aspects of the present disclosure. In some examples, process 400 may implement aspects of wireless communications systems 100 and/or 200 and/or process 300. Process 400 may be implemented by UE 405 or base station 410, or both, which may be examples of corresponding devices described herein.

At 415, UE 405 may transmit (and base station 410 may receive) a UE message during a connection establishment procedure. The UE message may carry or otherwise convey an indication of support by UE 405 for a plurality of connected modes, such as RRC connected modes. The plurality of connected modes may include an RRC connected mode, an RRC connected lite mode, an RRC inactive mode, or an RRC idle mode. The UE message may carry or otherwise convey an indication of support for a first connected mode (e.g., an RRC connected lite mode, an RRC inactive mode, or the like). In some examples, the first connected mode uses or is otherwise associated with grantless resource scheduling for UE 405. The first connected mode may be free from acknowledgment feedback messaging, configured control channel(s), mobility management, or channel performance measurement and reporting. The UE message may carry or otherwise convey an indication that the first connected mode is a preferred connected mode of UE 405.

At 420, base station 410 may transmit (and UE 405 may receive) a configuration message configuring resources for UE 405 to use while operating in the first connected mode (e.g., in the RRC connected lite mode). The configuration message may be provided based, at least in some aspects, on the UE message. For example, base station 410 may configure the resources for UE 405 to use while operating in the first connected mode when the UE message indicates support for UE 405 to operate in the first connected mode (e.g., in the RRC connected lite mode). The configured resources may be SPS resources for grantless downlink communications or CG resources for grantless uplink communications.

At 425, UE 405 and base station 410 may perform grantless communications while UE 405 operates in the first connected mode and using the configured resources. The grantless communications may be uplink communications or downlink communications.

This may include UE 405 refraining from performance reference signal transmissions in conjunction with performing the grantless communications with base station 410 based on UE 405 operating in the first connected mode. That is, UE 405 may refrain from performing CSI information during the downlink communications or refrain from transmitting SRS during grantless uplink communications. This may include a first protocol layer (e.g., the RLC layer) of UE 405 may determine that the grantless communications have failed in a second protocol layer (e.g., the physical layer). Accordingly and at the first protocol layer of UE 405 (e.g., the RLC layer), UE 405 may perform a retransmission of the grantless communication with the base station 410. This may include UE 405 determining that the mobility of UE 405 is below a threshold (e.g., has low or no mobility) or that UE 405 has an amount of data below a threshold (e.g., a small data transmission). In this example, UE 405 may refrain from performing mobility management while operating in the first connected mode.

In some aspects, UE 405 may transition from the first connected mode (e.g., the RRC connected lite mode, an RRC inactive mode, or the like) to a second connected mode based on expiration of an RRC connection release, a connection release message, an expiration of the data inactivity timer, or upon receipt of a signal indicating for the UE to transition from the first connected mode to the second connected mode. The second connected mode may be at least one of an RRC connected mode, an RRC inactive mode, or an RRC idle mode.

Figure 5:
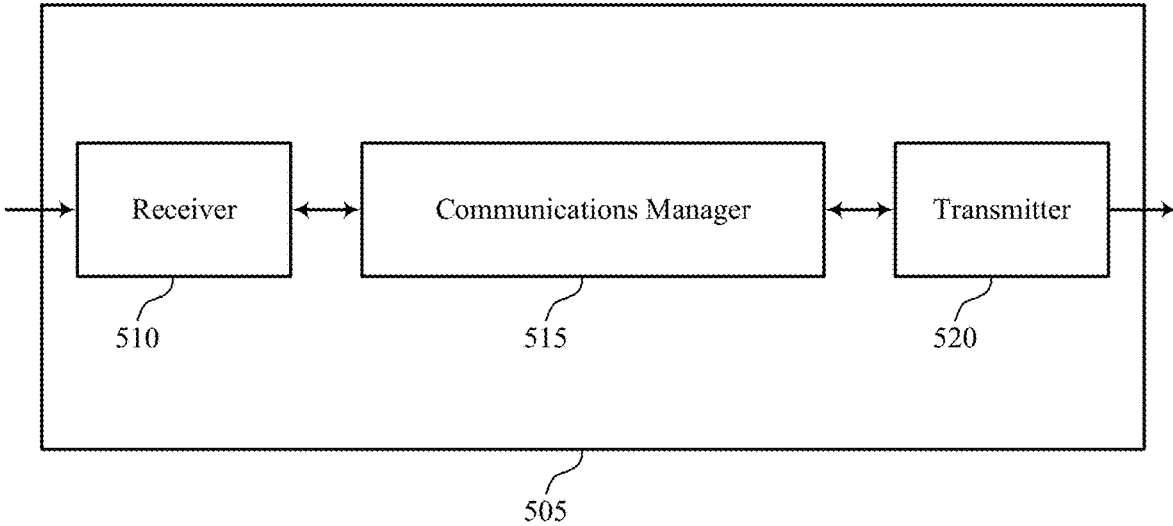
FIGS. 5 and 6 show block diagrams of devices that support methods for power-efficient transfer of small data in RRC connected lite mode in accordance with aspects of the present disclosure.

FIG. 5 shows a block diagram 500 of a device 505 that supports methods for power-efficient transfer of small data in RRC connected lite mode in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, or information related to methods for power-efficient transfer of small data in RRC connected lite mode). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit, to a base station during a connection establishment procedure, a UE message indicating support for a set of connected modes, where the set of connected modes includes a first connected mode, receive, based on the UE message, a configuration message from the base station configuring resources for the UE to use while operating in the first connected mode, and perform a grantless communication with the base station while operating in the first connected mode and using the configured resources. The communications manager 515 may be an example of aspects of the communications manager 810 described herein. In some examples, the first connected mode is associated with grantless resource scheduling and free of at least one of acknowledgment feedback messaging, or a configured control channel, or mobility management, or channel performance measurement and reporting, or a combination thereof.

The communications manager 515, or its sub-components, may be implemented in hardware, software (e.g., executed by a processor), or any combination thereof. If implemented in code executed by a processor, the functions of the communications manager 515, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure. The actions performed by the communications manager 515 as described herein may be implemented to realize one or more potential advantages. One implementation may allow a UE 115 to save resources as well as power and increase battery life by refraining from transitioning to a RRC connected mode. Another implementation may provide improved quality and reliability of service at the UE 115, as latency and the number of separate resources allocated to the UE 115 may be reduced.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
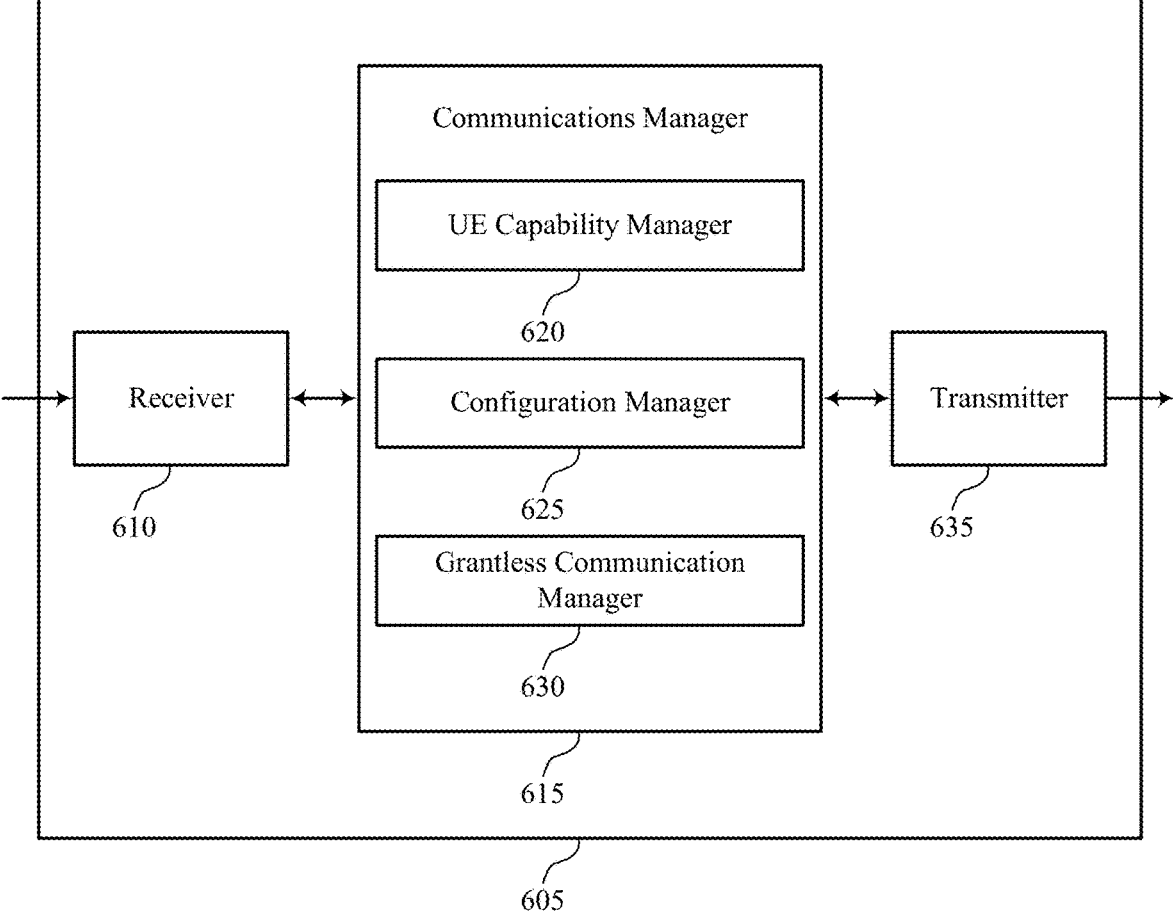

FIG. 6 shows a block diagram 600 of a device 605 that supports methods for power-efficient transfer of small data in RRC connected lite mode in accordance with aspects of the present disclosure. The device 605 may be an example of aspects of a device 505, or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to methods for power-efficient transfer of small data in RRC connected lite mode). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a UE capability manager 620, a configuration manager 625, and a grantless communication manager 630. The communications manager 615 may be an example of aspects of the communications manager 810 described herein.

The UE capability manager 620 may transmit, to a base station during a connection establishment procedure, a UE message indicating support for a set of connected modes, where the set of connected modes includes a first connected mode. In some examples, the first connected mode is associated with grantless resource scheduling and free of at least one of acknowledgment feedback messaging, or a configured control channel, or mobility management, or channel performance measurement and reporting, or a combination thereof. The UE capability manager 620 may configure the UE message to identify the first connected mode as the preferred connected mode for the UE.

The configuration manager 625 may receive, based on the UE message, a configuration message from the base station configuring resources for the UE to use while operating in the first connected mode.

The grantless communication manager 630 may perform a grantless communication with the base station while operating in the first connected mode and using the configured resources.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
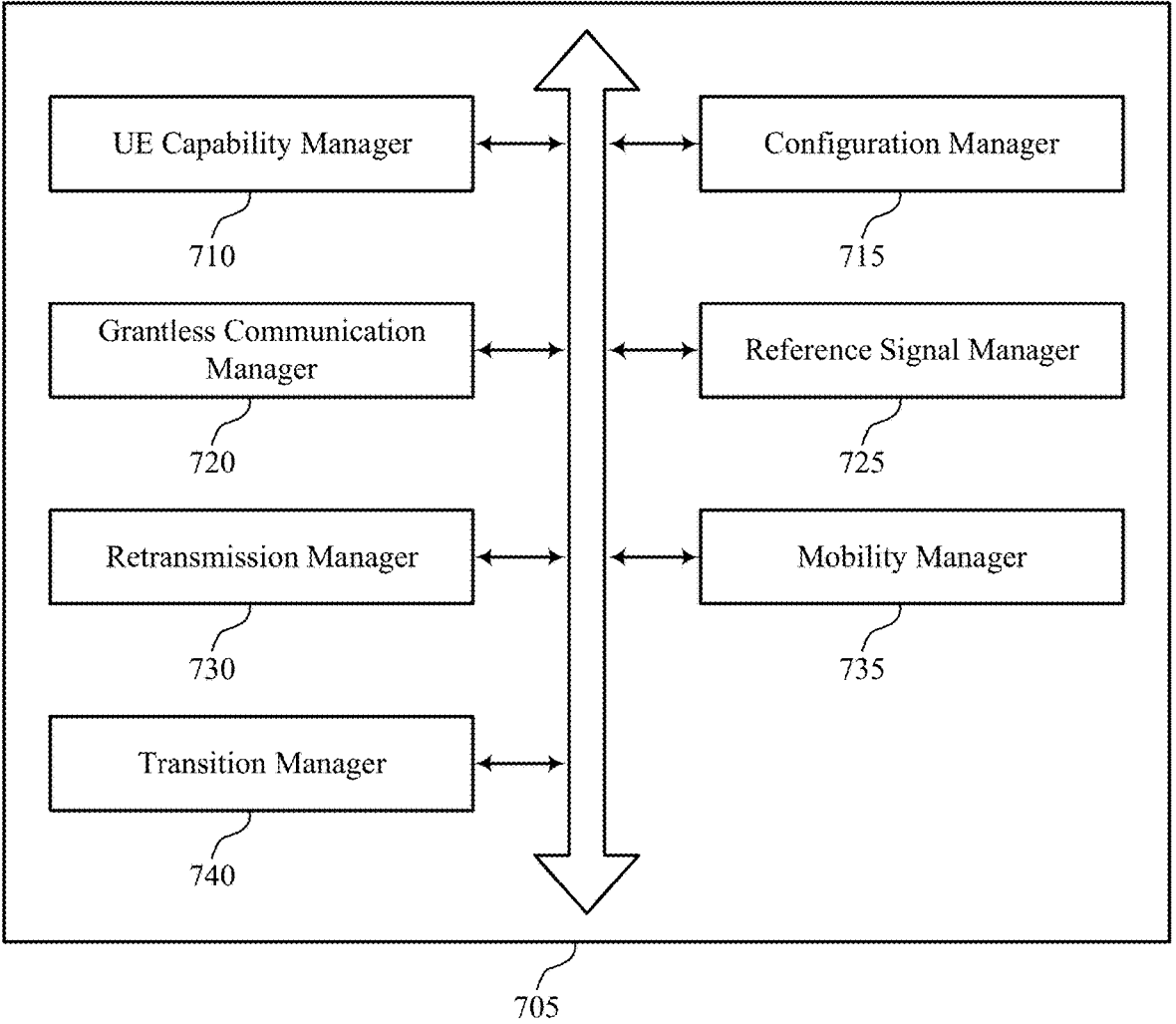
FIG. 7 shows a block diagram of a communications manager that supports methods for power-efficient transfer of small data in RRC connected lite mode in accordance with aspects of the present disclosure.

FIG. 7 shows a block diagram 700 of a communications manager 705 that supports methods for power-efficient transfer of small data in RRC connected lite mode in accordance with aspects of the present disclosure. The communications manager 705 may be an example of aspects of a communications manager 515, a communications manager 615, or a communications manager 810 described herein. The communications manager 705 may include a UE capability manager 710, a configuration manager 715, a grantless communication manager 720, a reference signal manager 725, a retransmission manager 730, a mobility manager 735, and a transition manager 740. Each of these modules may communicate, directly or indirectly, with one another (e.g., via one or more buses).

The UE capability manager 710 may transmit, to a base station during a connection establishment procedure, a UE message indicating support for a set of connected modes, where the set of connected modes includes a first connected mode. In some cases, the UE message is transmitted as part of a RACH msgA, or a RACH msg3, or a UE assistance information message, or a combination thereof. In some cases, the first connected mode includes an RRC inactive mode. In some cases, the set of connected modes includes an RRC connected mode, an RRC connected lite mode, the RRC inactive mode, and an RRC idle mode. In some aspects, the first connected mode is associated with grantless resource scheduling and free of at least one of acknowledgment feedback messaging, or a configured control channel, or mobility management, or channel performance measurement and reporting, or a combination thereof. The UE capability manager 710 may configure the UE message to identify the first connected mode as a preferred connected mode for the UE. The UE capability manager 710 may transmit to the base station, information for scheduling subsequent data transmissions comprising one or more of a buffer status report, a preferred beam index, a beam measurement report, a power headroom report, a mobility state, or a combination thereof, where the information for scheduling subsequent data transmissions is transmitted in one of a RACH msg3 or a RACH message 5 (msg5)

The configuration manager 715 may receive, based on the UE message, a configuration message from the base station configuring resources for the UE to use while operating in the first connected mode. In some cases, the configured control channel includes at least one of a PDCCH, or a PUCCH, or a combination thereof. In some cases, the configured resources include at least one of SPS resources for grantless downlink communications, or CG resources for grantless uplink communications, or a combination thereof. In some cases, the UE message includes an RRC resume message of a RACH msg3. In some cases, one or more parameters associated with the configured resources are received in a Release-Config message.

The grantless communication manager 720 may perform a grantless communication with the base station while operating in the first connected mode and using the configured resources. In some cases, the grantless communication includes uplink communication, downlink communication, or a combination thereof.

The reference signal manager 725 may refrain from performing reference signal transmissions in conjunction with performing the grantless communication with the base station based on the UE operating in the first connected mode.

The retransmission manager 730 may determine, at a first protocol layer of the UE, that the grantless communication has failed in a second protocol layer of the UE. In some examples, the retransmission manager 730 may perform, at the first protocol layer of the UE, a retransmission of the grantless communication with the base station.

The mobility manager 735 may determine that at least one of a mobility of the UE is below a threshold, or that the UE has an amount of data below a threshold, or a combination thereof. In some examples, the mobility manager 735 may refrain from performing mobility management while operating in the first connected mode and based on the determining.

The transition manager 740 may transition from the first connected mode to a second connected mode based on expiry of an RRC connection lease, or expiry of a data inactivity timer, or upon receipt of a signal indicating for the UE to transition from the first connected mode to the second connected mode, or a combination thereof.

Figure 8:
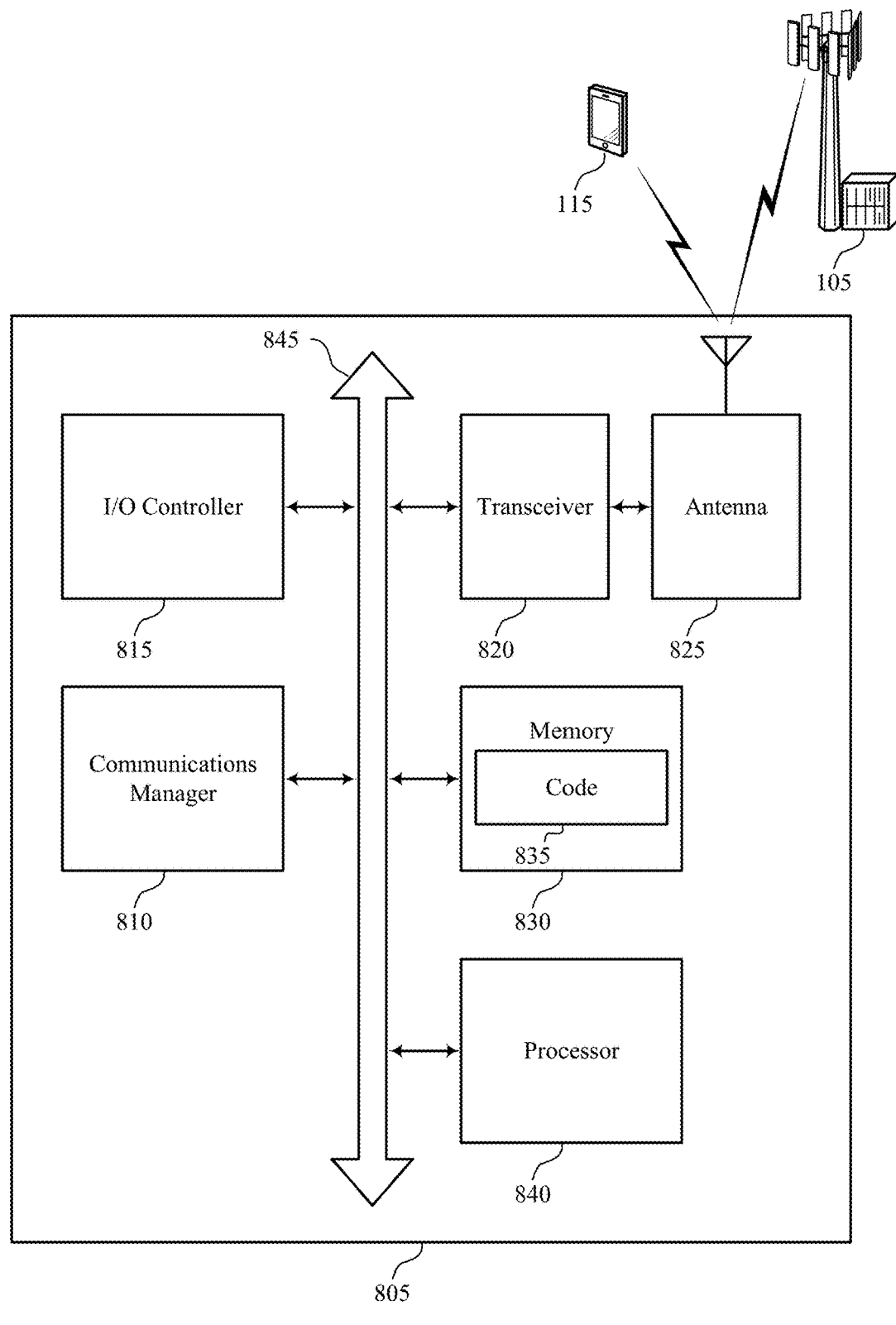
FIG. 8 shows a diagram of a system including a device that supports methods for power-efficient transfer of small data in RRC connected lite mode in accordance with aspects of the present disclosure.

FIG. 8 shows a diagram of a system 800 including a device 805 that supports methods for power-efficient transfer of small data in RRC connected lite mode in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit, to a base station during a connection establishment procedure, a UE message indicating support for a set of connected modes, where the set of connected modes includes a first connected mode, receive, based on the UE message, a configuration message from the base station configuring resources for the UE to use while operating in the first connected mode, and perform a grantless communication with the base station while operating in the first connected mode and using the configured resources. In some examples, the first connected mode is associated with grantless resource scheduling and free of at least one of acknowledgment feedback messaging, or a configured control channel, or mobility management, or channel performance measurement and reporting, or a combination thereof.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touch-screen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described herein. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic I/O system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting methods for power-efficient transfer of small data in RRC connected lite mode).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

The actions performed by the processor 840, memory 830, I/O controller 815, communications manager 810, transceiver 820, and antenna 825 as described herein may be implemented to realize one or more potential advantages. One implementation may allow the device 805 to conserve resources by refraining from transitioning from a first connected mode to a second connected mode. Another implementation may provide improved data throughput and user experience at the device 805 through the reduction of signaling overhead.

Figure 9:
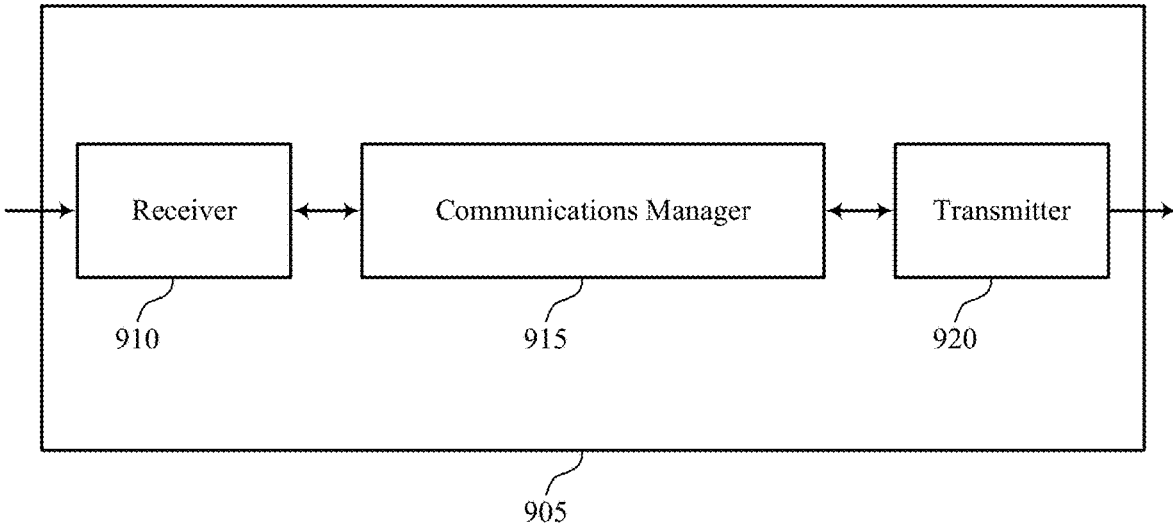
FIGS. 9 and 10 show block diagrams of devices that support methods for power-efficient transfer of small data in RRC connected lite mode in accordance with aspects of the present disclosure.

FIG. 9 shows a block diagram 900 of a device 905 that supports methods for power-efficient transfer of small data in RRC connected lite mode in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to methods for power-efficient transfer of small data in RRC connected lite mode). Information may be passed on to other components of the device 905. The receiver 910 may be an example of aspects of the transceiver 1220 described with reference to FIG. 12. The receiver 910 may utilize a single antenna or a set of antennas.

The communications manager 915 may receive, from a UE during a connection establishment procedure, a UE message indicating support for a set of connected modes, where the set of connected modes includes a first connected mode, transmit, based on the UE message, a configuration message to the UE configuring resources for the UE to use while operating in the first connected mode, and perform a grantless communication with the UE while operating in the first connected mode and using the configured resources. In some examples, the first connected mode is associated with grantless resource scheduling and free of at least one of acknowledgment feedback messaging, or a configured control channel, or mobility management, or channel performance measurement and reporting, or a combination thereof. The communications manager 915 may be an example of aspects of the communications manager 1210 described herein.

The communications manager 915, or its sub-components, may be implemented in hardware, software (e.g., executed by a processor), or any combination thereof. If implemented in code executed by a processor, the functions of the communications manager 915, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure. The actions performed by the communications manager 915 as described herein may be implemented to realize one or more potential advantages. One implementation may allow a base station 105 to save resources as well as power and increase battery life by performing a grantless communication with a UE 115. Another implementation may provide improved quality and reliability of service at the base station 105, as latency and the number of separate resources allocated may be reduced.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
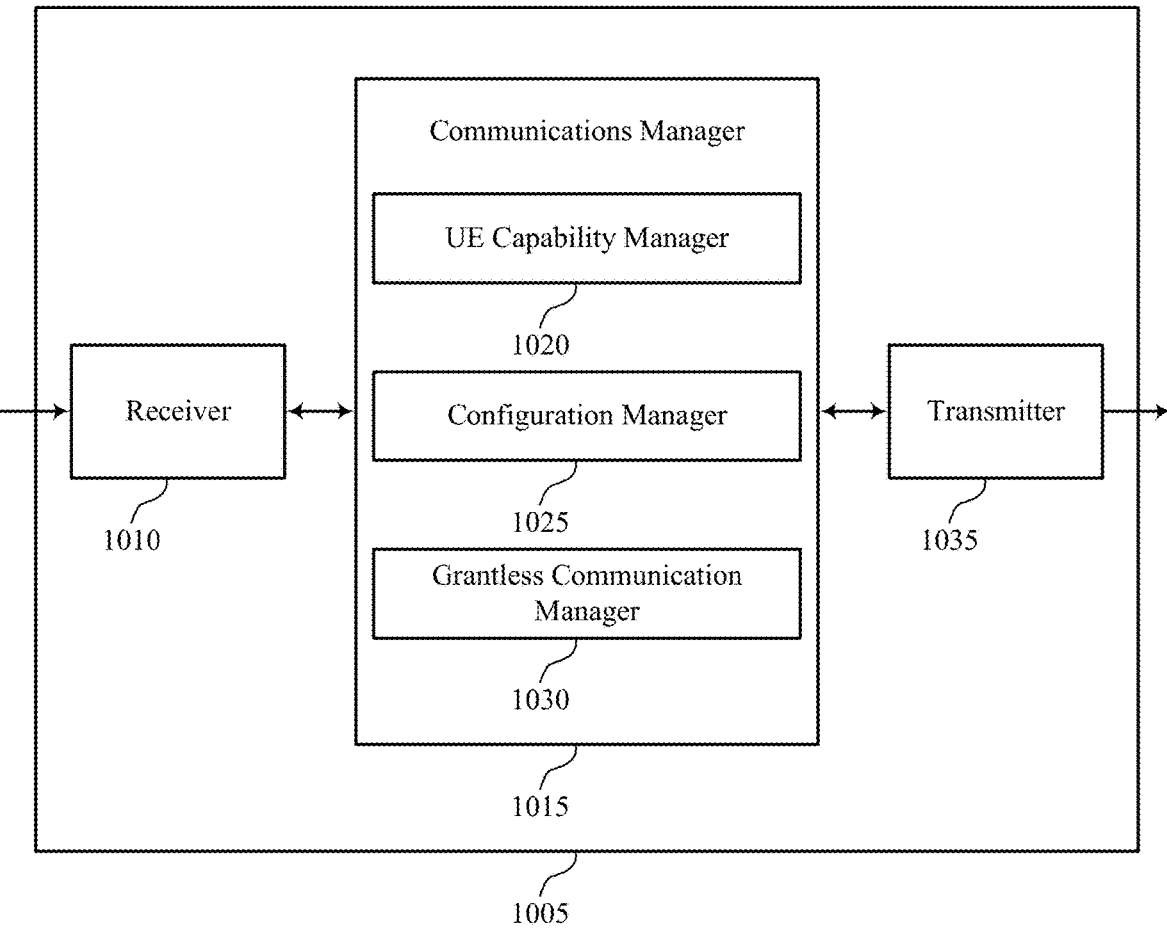

FIG. 10 shows a block diagram 1000 of a device 1005 that supports methods for power-efficient transfer of small data in RRC connected lite mode in accordance with aspects of the present disclosure. The device 1005 may be an example of aspects of a device 905, or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to methods for power-efficient transfer of small data in RRC connected lite mode). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include a UE capability manager 1020, a configuration manager 1025, and a grantless communication manager 1030. The communications manager 1015 may be an example of aspects of the communications manager 1210 described herein.

The UE capability manager 1020 may receive, from a UE during a connection establishment procedure, a UE message indicating support for a set of connected modes, where the set of connected modes includes a first connected mode, In some examples, the first connected mode is associated with grantless resource scheduling and free of at least one of acknowledgment feedback messaging, or a configured control channel, or mobility management, or channel performance measurement and reporting, or a combination thereof. The UE capability manager 1020 may determine that the UE message identifies the first connected mode as the preferred connected mode for the UE.

The configuration manager 1025 may transmit, based on the UE message, a configuration message to the UE configuring resources for the UE to use while operating in the first connected mode.

The grantless communication manager 1030 may perform a grantless communication with the UE while operating in the first connected mode and using the configured resources.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
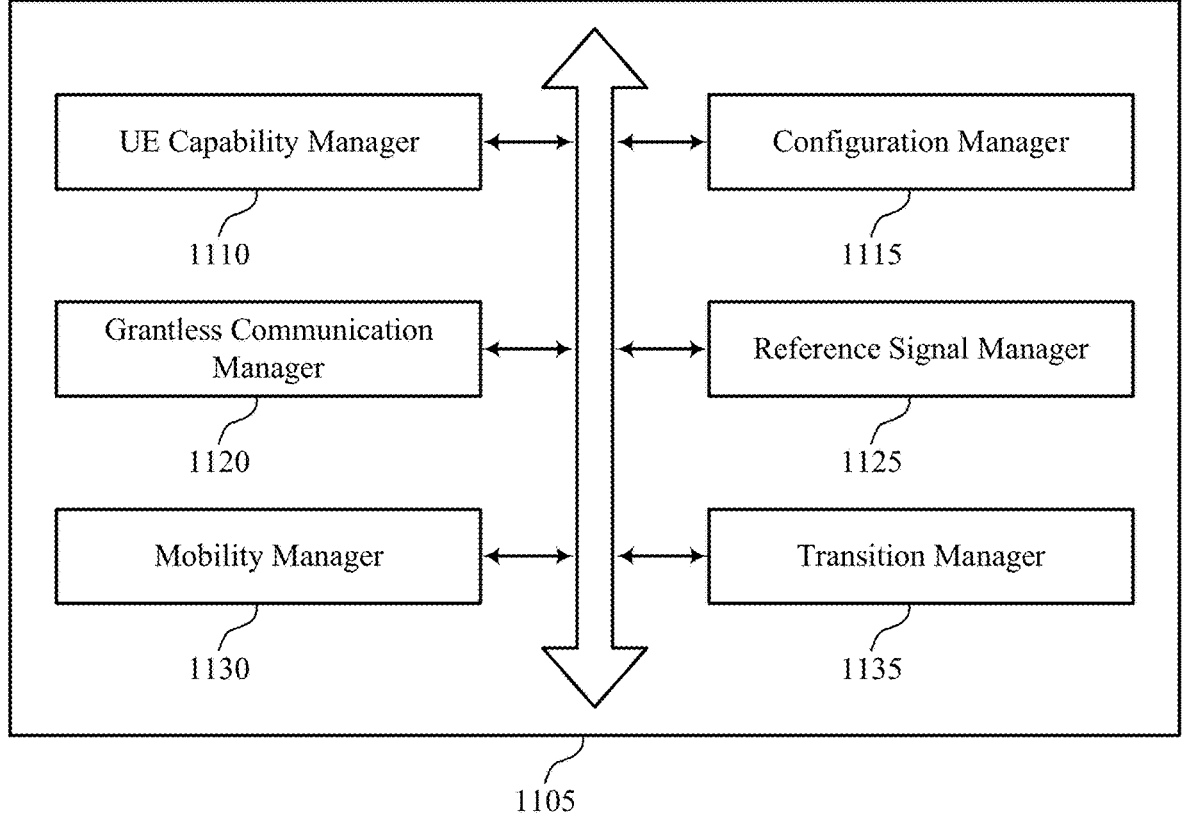
FIG. 11 shows a block diagram of a communications manager that supports methods for power-efficient transfer of small data in RRC connected lite mode in accordance with aspects of the present disclosure.

FIG. 11 shows a block diagram 1100 of a communications manager 1105 that supports methods for power-efficient transfer of small data in RRC connected lite mode in accordance with aspects of the present disclosure. The communications manager 1105 may be an example of aspects of a communications manager 915, a communications manager 1015, or a communications manager 1210 described herein. The communications manager 1105 may include a UE capability manager 1110, a configuration manager 1115, a grantless communication manager 1120, a reference signal manager 1125, a mobility manager 1130, and a transition manager 1135. Each of these modules may communicate, directly or indirectly, with one another (e.g., via one or more buses).

The UE capability manager 1110 may receive, from a UE during a connection establishment procedure, a UE message indicating support for a set of connected modes, where the set of connected modes includes a first connected mode, In some examples, the first connected mode is associated with grantless resource scheduling and free of at least one of acknowledgment feedback messaging, or a configured control channel, or mobility management, or channel performance measurement and reporting, or a combination thereof. In some cases, the UE message is transmitted as part of a RACH msgA, or a RACH msg3, or a UE assistance information message, or a combination thereof. In some cases, the first connected mode includes an RRC inactive mode. In some cases, the set of connected modes includes an RRC connected mode, an RRC connected lite mode, the RRC inactive mode, and an RRC idle mode. The UE capability manager 1110 may receive, from the UE, information for scheduling subsequent data transmissions comprising one or more of a buffer status report, a preferred beam index, a beam measurement report, a power headroom report, a mobility state, or a combination thereof, where the information for scheduling subsequent data transmissions is transmitted in one of a RACH msg3 or a RACH msg5.

The configuration manager 1115 may transmit, based on the UE message, a configuration message to the UE configuring resources for the UE to use while operating in the first connected mode. In some cases, the configured control channel includes at least one of a PDCCH, or a PUCCH, or a combination thereof. In some cases, the configured resources include at least one of SPS resources for grantless downlink communications, or CG resources for grantless uplink communications, or a combination thereof. In some cases, the UE message includes an RRC resume message of a RACH msg3, In some cases, one or more parameters associated with the configured resources are received in a Release-Config message.

The grantless communication manager 1120 may perform a grantless communication with the UE while operating in the first connected mode and using the configured resources. In some cases, the grantless communication includes uplink communication, downlink communication, or a combination thereof.

The reference signal manager 1125 may perform the grantless communication with the UE free of reference signal transmissions by the UE based on the UE operating in the first connected mode.

The mobility manager 1130 may determine that at least one of a mobility of the UE is below a threshold, or that the UE has an amount of data below a threshold, or a combination thereof. In some examples, the mobility manager 1130 may refrain from performing mobility management for the UE while the UE is operating in the first connected mode and based on the determining.

The transition manager 1135 may transition the UE from the first connected mode to a second connected mode based on expiry of an RRC connection lease, or expiry of a data inactivity timer, or upon receipt of a signal indicating for the UE to transition from the first connected mode to the second connected mode, or a combination thereof.

Figure 12:
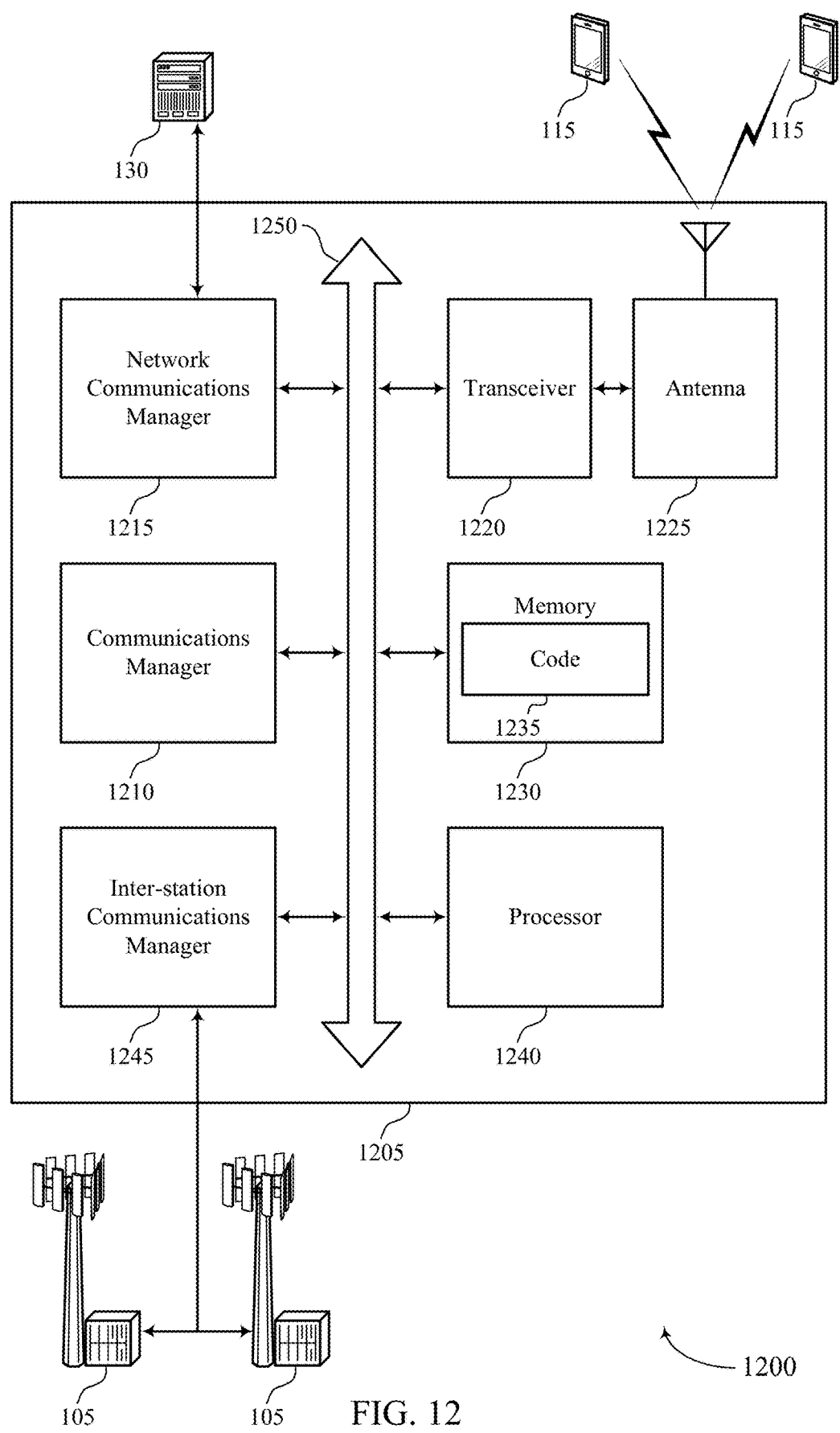
FIG. 12 shows a diagram of a system including a device that supports methods for power-efficient transfer of small data in RRC connected lite mode in accordance with aspects of the present disclosure.

FIG. 12 shows a diagram of a system 1200 including a device 1205 that supports methods for power-efficient transfer of small data in RRC connected lite mode in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may receive, from a UE during a connection establishment procedure, a UE message indicating support for a set of connected modes, where the set of connected modes includes a first connected mode. In some examples, the first connected mode is associated with grantless resource scheduling and free of at least one of acknowledgment feedback messaging, or a configured control channel, or mobility management, or channel performance measurement and reporting, or a combination thereof, transmit, based on the UE message, a configuration message to the UE configuring resources for the UE to use while operating in the first connected mode, and perform a grantless communication with the UE while operating in the first connected mode and using the configured resources.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described herein. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device 1205 to perform various functions (e.g., functions or tasks supporting methods for power-efficient transfer of small data in RRC connected lite mode).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

The actions performed by the processor 1240, memory 1230, network communications manager 1215, communications manager 1210, transceiver 1220, and antenna 1225 as described herein may be implemented to realize one or more potential advantages. One implementation may allow the device 1205 to conserve resources by refraining from transitioning from a first connected mode to a second connected mode. Another implementation may provide improved data throughput and user experience at the device 1205 through the reduction of signaling overhead.

FIG. 13 shows a flowchart illustrating a method 1300 that supports methods for power-efficient transfer of small data in RRC connected lite mode in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1305, the UE may transmit, to a base station during a connection establishment procedure, a UE message indicating support for a set of connected modes, where the set of connected modes includes a first connected mode. The operations of 1305 may be performed according to the methods described herein. In some examples, aspects of the operations of 1305 may be performed by a UE capability manager as described with reference to FIGS. 5 through 8.

At 1310, the UE may receive, based on the UE message, a configuration message from the base station configuring resources for the UE to use while operating in the first connected mode. The operations of 1310 may be performed according to the methods described herein. In some examples, aspects of the operations of 1310 may be performed by a configuration manager as described with reference to FIGS. 5 through 8.

At 1315, the UE may perform a grantless communication with the base station while operating in the first connected mode and using the configured resources. The operations of 1315 may be performed according to the methods described herein. In some examples, aspects of the operations of 1315 may be performed by a grantless communication manager as described with reference to FIGS. 5 through 8.

FIG. 14 shows a flowchart illustrating a method 1400 that supports methods for power-efficient transfer of small data in RRC connected lite mode in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1405, the UE may transmit, to a base station during a connection establishment procedure, a UE message indicating support for a set of connected modes, where the set of connected modes includes a first connected mode. The operations of 1405 may be performed according to the methods described herein. In some examples, aspects of the operations of 1405 may be performed by a UE capability manager as described with reference to FIGS. 5 through 8.

At 1410, the UE may receive, based on the UE message, a configuration message from the base station configuring resources for the UE to use while operating in the first connected mode. The operations of 1410 may be performed according to the methods described herein. In some examples, aspects of the operations of 1410 may be performed by a configuration manager as described with reference to FIGS. 5 through 8.

At 1415, the UE may perform a grantless communication with the base station while operating in the first connected mode and using the configured resources. The operations of 1415 may be performed according to the methods described herein. In some examples, aspects of the operations of 1415 may be performed by a grantless communication manager as described with reference to FIGS. 5 through 8.

At 1420, the UE may refrain from performing reference signal transmissions in conjunction with performing the grantless communication with the base station based on the UE operating in the first connected mode. The operations of 1420 may be performed according to the methods described herein. In some examples, aspects of the operations of 1420 may be performed by a reference signal manager as described with reference to FIGS. 5 through 8.

FIG. 15 shows a flowchart illustrating a method 1500 that supports methods for power-efficient transfer of small data in RRC connected lite mode in accordance with aspects of the present disclosure. The operations of method 1500 may be implemented by a UE 115 or its components as described herein. For example, the operations of method 1500 may be performed by a communications manager as described with reference to FIGS. 5 through 8. In some examples, a UE may execute a set of instructions to control the functional elements of the UE to perform the functions described herein. Additionally or alternatively, a UE may perform aspects of the functions described herein using special-purpose hardware.

At 1505, the UE may transmit, to a base station during a connection establishment procedure, a UE message indicating support for a set of connected modes, where the set of connected modes includes a first connected mode. The operations of 1505 may be performed according to the methods described herein. In some examples, aspects of the operations of 1505 may be performed by a UE capability manager as described with reference to FIGS. 5 through 8.

At 1510, the UE may receive, based on the UE message, a configuration message from the base station configuring resources for the UE to use while operating in the first connected mode. The operations of 1510 may be performed according to the methods described herein. In some examples, aspects of the operations of 1510 may be performed by a configuration manager as described with reference to FIGS. 5 through 8.

At 1515, the UE may perform a grantless communication with the base station while operating in the first connected mode and using the configured resources. The operations of 1515 may be performed according to the methods described herein. In some examples, aspects of the operations of 1515 may be performed by a grantless communication manager as described with reference to FIGS. 5 through 8.

At 1520, the UE may determine, at a first protocol layer of the UE, that the grantless communication has failed in a second protocol layer of the UE. The operations of 1520 may be performed according to the methods described herein. In some examples, aspects of the operations of 1520 may be performed by a retransmission manager as described with reference to FIGS. 5 through 8.

At 1525, the UE may perform, at the first protocol layer of the UE, a retransmission of the grantless communication with the base station. The operations of 1525 may be performed according to the methods described herein. In some examples, aspects of the operations of 1525 may be performed by a retransmission manager as described with reference to FIGS. 5 through 8.

FIG. 16 shows a flowchart illustrating a method 1600 that supports methods for power-efficient transfer of small data in RRC connected lite mode in accordance with aspects of the present disclosure. The operations of method 1600 may be implemented by a base station 105 or its components as described herein. For example, the operations of method 1600 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1605, the base station may receive, from a UE during a connection establishment procedure, a UE message indicating support for a set of connected modes, where the set of connected modes includes a first connected mode. The operations of 1605 may be performed according to the methods described herein. In some examples, aspects of the operations of 1605 may be performed by a UE manager as described with reference to FIGS. 9 through 12.

At 1610, the base station may transmit, based on the UE message, a configuration message to the UE configuring resources for the UE to use while operating in the first connected mode. The operations of 1610 may be performed according to the methods described herein. In some examples, aspects of the operations of 1610 may be performed by a configuration manager as described with reference to FIGS. 9 through 12.

At 1615, the base station may perform a grantless communication with the UE while operating in the first connected mode and using the configured resources. The operations of 1615 may be performed according to the methods described herein. In some examples, aspects of the operations of 1615 may be performed by a grantless communication manager as described with reference to FIGS. 9 through 12.

FIG. 17 shows a flowchart illustrating a method 1700 that supports methods for power-efficient transfer of small data in RRC connected lite mode in accordance with aspects of the present disclosure. The operations of method 1700 may be implemented by a base station 105 or its components as described herein. For example, the operations of method 1700 may be performed by a communications manager as described with reference to FIGS. 9 through 12. In some examples, a base station may execute a set of instructions to control the functional elements of the base station to perform the functions described herein. Additionally or alternatively, a base station may perform aspects of the functions described herein using special-purpose hardware.

At 1705, the base station may receive, from a UE during a connection establishment procedure, a UE message indicating support for a set of connected modes, where the set of connected modes includes a first connected mode. The operations of 1705 may be performed according to the methods described herein. In some examples, aspects of the operations of 1705 may be performed by a UE manager as described with reference to FIGS. 9 through 12.

At 1710, the base station may transmit, based on the UE message, a configuration message to the UE configuring resources for the UE to use while operating in the first connected mode. The operations of 1710 may be performed according to the methods described herein. In some examples, aspects of the operations of 1710 may be performed by a configuration manager as described with reference to FIGS. 9 through 12.

At 1715, the base station may perform a grantless communication with the UE while operating in the first connected mode and using the configured resources. The operations of 1715 may be performed according to the methods described herein. In some examples, aspects of the operations of 1715 may be performed by a grantless communication manager as described with reference to FIGS. 9 through 12.

At 1720, the base station may determine that at least one of a mobility of the UE is below a threshold, or that the UE has an amount of data below a threshold, or a combination thereof. The operations of 1720 may be performed according to the methods described herein. In some examples, aspects of the operations of 1720 may be performed by a mobility manager as described with reference to FIGS. 9 through 12.

At 1725, the base station may refrain from performing mobility management for the UE while the UE is operating in the first connected mode and based on the determining. The operations of 1725 may be performed according to the methods described herein. In some examples, aspects of the operations of 1725 may be performed by a mobility manager as described with reference to FIGS. 9 through 12.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA). CDMA2000 covers IS-2000, IS-95, and IS-856 standards. IS-2000 Releases be commonly referred to as CDMA2000 1x, and 1x. IS-856 (TIA-856) is commonly referred to as CDMA2000 1×EV-DO, High Rate Packet Data (HRPD). UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, and Flash-OFDM. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed or unlicensed) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). A base station, such as a gNB for a macro cell may be referred to as a macro base station (e.g., a macro gNB). A base station for a small cell may be referred to as a small cell base station (e.g., a small cell gNB), a pico base station (e.g., a pico gNB), a femto base station (a femto gNB), or a home base station (e.g., a home gNB). A base station may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, or functions, whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communication at a user equipment (UE), comprising:
    at least one processor; and
    one or more memories coupled to the at least one processor, the one or more memories storing instructions executable by the at least one processor to cause the UE to:
        transmit, to a network entity, a UE message indicating support for at least one connected mode, wherein the at least one connected mode comprises a radio resource control inactive mode;
        receive, based at least in part on the UE message and from the network entity, a release message that indicates configured resources and indicates one or more parameters associated with the configured resources for the UE to use while operating in the radio resource control inactive mode; and
        perform a grantless communication with the network entity while operating in the radio resource control inactive mode and using the configured resources in accordance with the release message and the one or more parameters, wherein performing the grantless communication using the configured resources is further based at least in part on an amount of data included in the grantless communication satisfying a threshold.

2. The apparatus of claim 1, wherein the instructions are executable by the at least one processor to cause the UE to:
    determine that at least one of a mobility of the UE is below a mobility threshold, or that the amount of data is below a data threshold, or a combination thereof; and
    refrain from performing mobility management while operating in the radio resource control inactive mode and based at least in part on the determining.

3. The apparatus of claim 1, wherein the instructions are further executable by the at least one processor to cause the UE to:
    transmit, to the network entity, information for scheduling subsequent data transmissions comprising one or more of a buffer status report, a preferred beam index, a beam measurement report, a power headroom report, a mobility state, or a combination thereof.

4. The apparatus of claim 3, wherein the configured resources are based at least in part one or more of the buffer status report, the preferred beam index, the beam measurement report, the power headroom report, the mobility state, or a combination thereof.

5. The apparatus of claim 3, wherein the information for scheduling the subsequent data transmissions is transmitted in one of a RACH msg3 or a RACH message 5 (msg5).

6. The apparatus of claim 1, wherein the radio resource control inactive mode is associated with grantless resource scheduling and free of at least one of acknowledgment feedback messaging, a configured control channel, mobility management, channel performance measurement and reporting, or a combination thereof.

7. The apparatus of claim 6, wherein the configured control channel comprises at least one of a physical downlink control channel (PDCCH), or a physical uplink control channel (PUCCH), or a combination thereof.

8. The apparatus of claim 1, wherein the instructions are further executable by the at least one processor to cause the UE to:

configure the UE message to identify the radio resource control inactive mode as a preferred connected mode of the UE.

9. The apparatus of claim 1, wherein the instructions are further executable by the at least one processor to cause the UE to:

refrain from performing reference signal transmissions in conjunction with performing the grantless communication with the network entity based at least in part on the UE operating in the radio resource control inactive mode.

10. The apparatus of claim 1, wherein the instructions are further executable by the at least one processor to cause the UE to:

determine, at a first protocol layer of the UE, that the grantless communication has failed in a second protocol layer of the UE; and perform, at the first protocol layer of the UE, a retransmission of the grantless communication with the network entity.

11. The apparatus of claim 1, wherein the instructions are further executable by the at least one processor to cause the UE to:

transition from the radio resource control inactive mode to another connected mode based at least in part on expiry of a radio resource control connection lease, expiry of a data inactivity timer, receipt of a signal indicating for the UE to transition from the radio resource control inactive mode to the another connected mode, or a combination thereof.

12. The apparatus of claim 1, wherein the UE message is transmitted as part of a random access channel (RACH) message A (msgA), or a RACH message 3 (msg3), or a UE assistance information message, or a combination thereof.

13. The apparatus of claim 1, wherein the grantless communication comprises uplink communication, downlink communication, or a combination thereof.

14. The apparatus of claim 1, wherein the configured resources comprise at least one of a semi-persistent scheduling (SPS) resources for grantless downlink communications, or a configured grant (CG) for grantless uplink communications, or a combination thereof.

15. The apparatus of claim 1, wherein the UE message comprises a radio resource control resume message of a RACH msg3.

16. An apparatus for wireless communication at a network entity, comprising:

at least one processor; and one or more memories coupled to the at least one processor, the one or more memories storing instructions executable by the at least one processor to cause the network entity to:

receive, from a user equipment (UE), a UE message indicating support for at least one connected mode, wherein the at least one connected mode comprises a radio resource control inactive mode;

transmit, to the UE based at least in part on the UE message, a release message that indicates configured resources and indicates one or more parameters associated with the configured resources for the UE to use while operating in the radio resource control inactive mode; and perform a grantless communication with the UE while operating in the radio resource control inactive mode and using the configured resources in accordance with the release message and the one or more parameters, wherein performing the grantless communication using the configured resources is further based at least in part on an amount of data included in the grantless communication satisfying a threshold.

17. The apparatus of claim 16, wherein the instructions are further executable by the at least one processor to cause the network entity to:

receive, from the UE, information for scheduling subsequent data transmissions comprising one or more of a buffer status report, a preferred beam index, a beam measurement report, a power headroom report, a mobility state, or a combination thereof, wherein the information for scheduling the subsequent data transmissions is transmitted in one of a RACH msg3 or a RACH message 5 (msg5).

18. The apparatus of claim 17, wherein the configured resources are based at least in part one or more of the buffer status report, the preferred beam index, the beam measurement report, the power headroom report, the mobility state, or a combination thereof.

19. The apparatus of claim 16, wherein the UE message is transmitted as part of a random access channel (RACH) message A (msgA), or a RACH message 3 (msg3), or a UE assistance information message, or a combination thereof.

20. The apparatus of claim 16, wherein the grantless communication comprises uplink communication, downlink communication, or a combination thereof.

21. The apparatus of claim 16, wherein the configured resources comprise at least one of a semi-persistent scheduling (SPS) resources for grantless downlink communications, or a configured grant (CG) for grantless uplink communications, or a combination thereof.

22. The apparatus of claim 16, wherein the UE message comprises a radio resource control resume message of a RACH msg3.

23. The apparatus of claim 16, wherein the instructions are executable by the at least one processor to cause the network entity to:

determine that the UE message identifies the radio resource control inactive mode as a preferred connected mode for the UE.

24. The apparatus of claim 16, wherein the instructions are further executable by the at least one processor to cause the network entity to:

perform the grantless communication with the UE free of reference signal transmissions by the UE based at least in part on the UE operating in the radio resource control inactive mode.

25. A method for wireless communication at a user equipment (UE), comprising:

transmitting, to a network entity, a UE message indicating support for at least one connected mode, wherein the at least one connected mode comprises a radio resource control inactive mode;

receiving, based at least in part on the UE message and from the network entity, a release message that indicates configured resources and indicates one or more parameters associated with the configured resources for the UE to use while operating in the radio resource control inactive mode; and performing a grantless communication with the network entity while operating in the radio resource control inactive mode and using the configured resources in accordance with the release message and the one or more parameters, wherein performing the grantless communication using the configured resources is further based at least in part on an amount of data included in the grantless communication satisfying a threshold.

26. A method for wireless communication at a network entity, comprising:

receiving, from a user equipment (UE), a UE message indicating support for at least one connected mode, wherein the at least one connected mode comprises a radio resource control inactive mode;

transmitting, to the UE based at least in part on the UE message, a release message that indicates configured resources and indicates one or more parameters associated with the configured resources for the UE to use while operating in the radio resource control inactive; and performing a grantless communication with the UE while operating in the radio resource control inactive mode and using the configured resources in accordance with the release message and the one or more parameters, wherein performing the grantless communication using the configured resources is further based at least in part on an amount of data included in the grantless communication satisfying a threshold.

\* \* \* \* \*